US008294950B2

(12) United States Patent
Shiraki et al.

(10) Patent No.: US 8,294,950 B2
(45) Date of Patent: Oct. 23, 2012

(54) IMAGE FORMING APPARATUS

(75) Inventors: Seiji Shiraki, Saitama (JP); Takaya Nagasaki, Saitama (JP); Hiroyuki Kawai, Tokyo (JP); Yasuo Komatsu, Saitama (JP); Kiyoshi Une, Saitama (JP); Takumi Nishikata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 575 days.

(21) Appl. No.: 12/545,603

(22) Filed: Aug. 21, 2009

(65) Prior Publication Data

US 2010/0214581 A1 Aug. 26, 2010

(30) Foreign Application Priority Data

Feb. 24, 2009 (JP) ................................. P2009-041062

(51) Int. Cl.
*G06F 15/00* (2006.01)
(52) U.S. Cl. ......... 358/1.9; 358/504; 382/162; 382/167; 382/169
(58) Field of Classification Search .................. 358/1.9, 358/504, 518; 382/162, 167, 169
See application file for complete search history.

(56) References Cited

U.S. PATENT DOCUMENTS

2009/0180688 A1* 7/2009 Sumi ............................ 382/167

FOREIGN PATENT DOCUMENTS

| JP | A-2000-301810 | 10/2000 |
|----|---------------|---------|
| JP | A-2001-47665 | 2/2001 |
| JP | A-2001-113684 | 4/2001 |
| JP | A-2001-130056 | 5/2001 |
| JP | A-2001-186322 | 7/2001 |
| JP | A-2002-44455 | 2/2002 |
| JP | A-2002-283680 | 10/2002 |
| JP | A-2003-234913 | 8/2003 |
| JP | B2-3539575 | 7/2004 |

* cited by examiner

*Primary Examiner* — Marivelisse Santiago Cordero
*Assistant Examiner* — Moustapha Diaby
(74) *Attorney, Agent, or Firm* — Oliff & Berridge, PLC

(57) ABSTRACT

An image forming apparatus includes; a chart data forming unit that forms density correcting chart data to be printed, in which reference density patterns and adjusting density patterns are arranged so that a connection angle, and the adjusting density patterns have different densities in the respective patterns; a printing unit that prints a density correcting chart in which the reference density patterns and the adjusting density patterns are arranged adjacent to each other in respective patterns; a receiving unit that receives an input of a density adjusting value of a desired pattern, on the basis of comparison of density between the reference density patterns and the adjusting density patterns which has been obtained from visual observation of a user on the printed density correcting chart; and a tone correcting unit that conducts tone correction of the desired pattern.

23 Claims, 26 Drawing Sheets

LOW SCREEN RULING REFERENCE PATTERN

TONE PATTERN TO BE SELECTED

TONE PATTERN

LOW SCREEN RULING REFERENCE PATTERN

COMPONENTS OF M, Y ARE CHANGED, WHILE COMPONENT OF C IS NOT CHANGED

ADJUSTING PATTERN (PROCESS BLACK HAVING DIFFERENT MIXING RATIO OF C, M, Y)

REFERENCE PATTERN (SINGLE COLOR OF BLACK, BRIGHTNESS 50)

COMPONENTS OF C, M ARE CHANGED, WHILE COMPONENT OF Y IS NOT CHANGED

COMPONENTS OF C, Y ARE CHANGED, WHILE COMPONENT OF M IS NOT CHANGED

FIG. 20
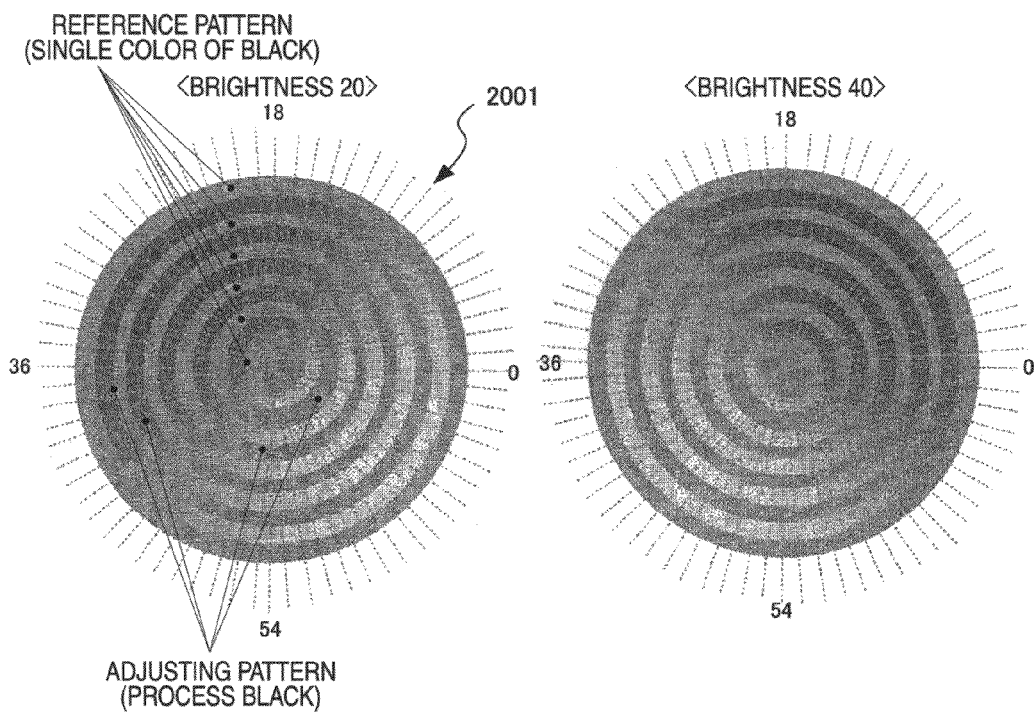
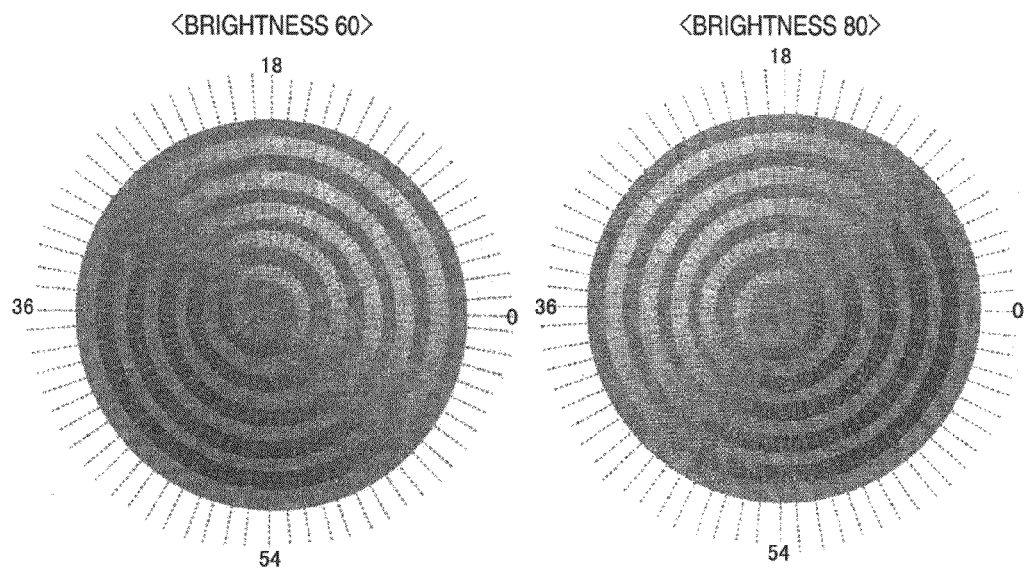

IMAGE FORMING APPARATUS

CROSS-REFERENCE TO RELATED APPLICATION

This application is based on and claims priority under 35 USC 119 from Japanese Patent Application No. 2009-041062 filed Feb. 24, 2009.

BACKGROUND

1. Technical Field

The present invention relates to an image forming apparatus.

2. Related Art

In an image forming apparatus such as a printer, a copying machine, etc., an image may be outputted with different quality of picture from the desired quality due to deterioration of components along with elapse of time, and calibration for correcting the difference in quality is required.

For the purpose of performing gray balance correction or tone correction as the calibration, the correction is carried out by printing a chart composed of a number of colors, and by comparing it with a reference chart which has been printed in advance, or reading it visually or with a measuring instrument.

Particularly, such a method for correction that a reference pattern and a tone pattern in which density and colors are varied are arranged in parallel and printed, and then, the density is visually judged to perform the correction can be carried out at a low cost, without using the measuring instrument and the reference chart. Therefore, various types of this method have been heretofore proposed.

SUMMARY

According to an aspect of the invention, an image forming apparatus includes; a chart data forming unit that forms density correcting chart data to be printed, in which reference density patterns and adjusting density patterns are arranged so that a connection angle at which the reference density patterns and the adjusting density patterns are contacted with each other contains all angles, and the adjusting density patterns have different densities in the respective patterns; a printing unit that prints a density correcting chart in which the reference density patterns and the adjusting density patterns are arranged adjacent to each other in respective patterns, on the basis of the density correcting chart data; a receiving unit that receives an input of a density adjusting value of a desired pattern, on the basis of comparison of density between the reference density patterns and the adjusting density patterns which has been obtained from visual observation of a user on the printed density correcting chart; and a tone correcting unit that conducts tone correction of the desired pattern, on the basis of the density adjusting value of the desired pattern which has been received by the receiving unit.

BRIEF DESCRIPTION OF THE DRAWINGS

Exemplary embodiments of the invention will be described in detail based on the following figures, wherein:

FIG. 20 is a schematic view showing a correcting chart in which colors are changed in a circumferential direction of concentric circles;

DETAILED DESCRIPTION

Now, exemplary embodiments of the invention will be described referring to the attached drawings.

Firstly, an image forming apparatus 1 will be described referring to FIG. 1.

Figure 1:
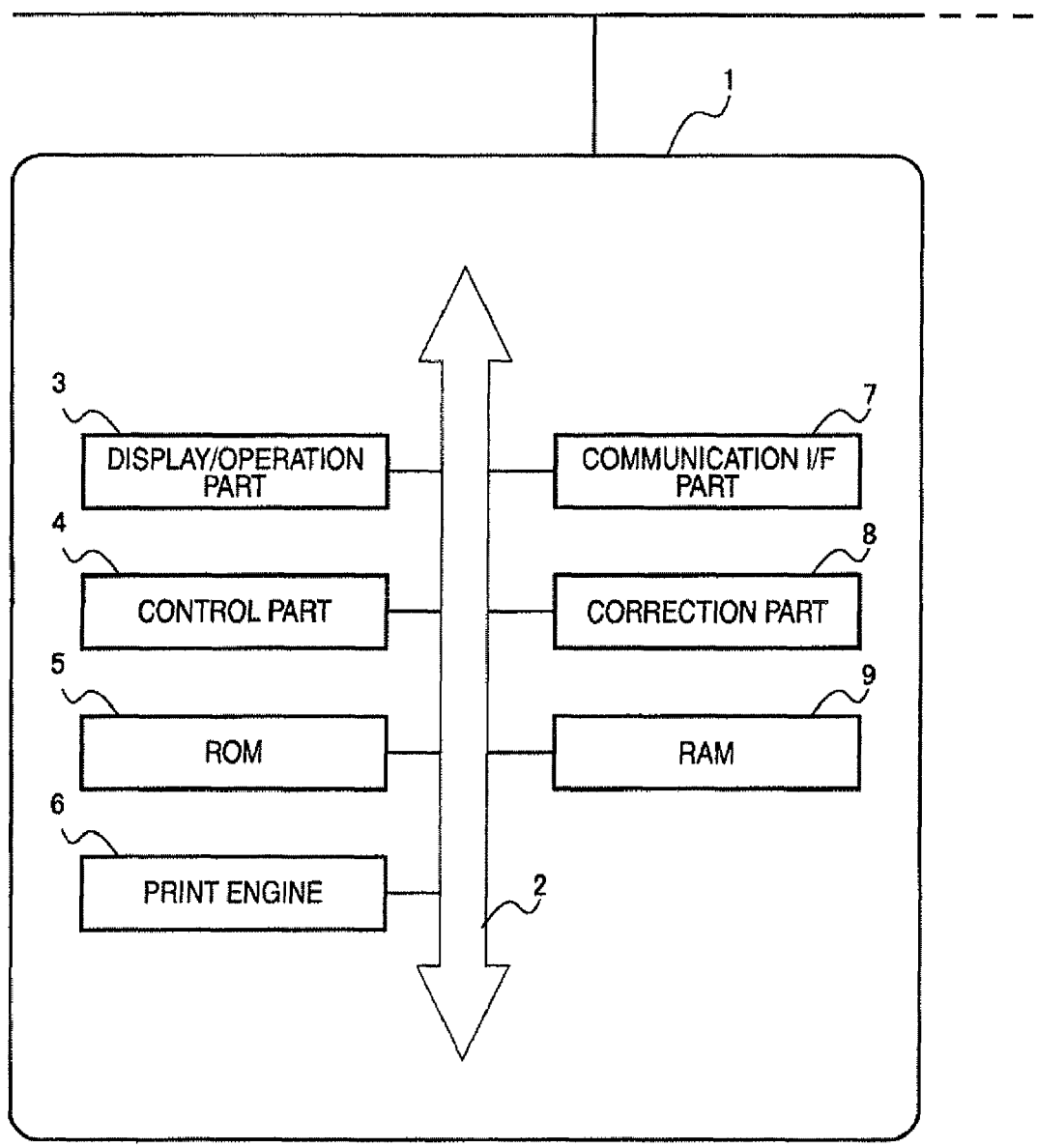
FIG. 1 is a schematic view showing a structure of an image forming apparatus 1.

FIG. 1 is a schematic view showing a structure of the image forming apparatus 1.

In the image forming apparatus 1, a display/operation part 3, a control part 4, a ROM (Read Only Memory) 5, a print engine 6, a communication I/F part 7, a correction part 8, and a RAM (Random Access Memory) 9 are connected together by way of a bus 2.

The display/operation part 3 includes a touch panel formed of liquid crystal, and operates functions of a user interface.

The control part 4 includes a CPU (Central Processing Unit), and performs extensive control of the image forming apparatus 1.

Moreover, the control part 4 forms image data of a tone correcting chart to be printed, on the RAM 9, using image data stored in the ROM 5, which are base of the tone correcting chart.

The ROM 5 stores the image data which are the base of the tone correcting chart to be printed out for conducting the tone correction of the image forming apparatus 1.

The ROM 5 also stores firmware for actuating the image forming apparatus 1.

The print engine 6 includes a paper tray which contains paper, an exposing unit which forms an electrostatic latent image of the image data on a photosensitive body, a developing unit for forming a toner image on the photosensitive body, a transfer unit for transferring the toner image from the photosensitive body to the paper, a fixing unit for fixing the toner image on the paper, and so on, and performs function of printing and outputting the image data on the paper.

The communication I/F part 7 is connected to a communication circuit, and performs communication such as reception of the image data which are sent from a personal computer or the like.

The correction part 8 performs a process for correcting density property which has been changed with elapse of time and due to external factors, on the basis of a value which has been inputted by a user from the display/operation part 3 based on the correcting chart which has been printed out.

Further, in the correction part 8, the tone correction by TRC (Tone Reproduction Curve) process and gray balance correction in which mixing ratio of CMY mixed in black (process black) is adjusted are carried out, on the basis of the values which have been received by the display/operation part 3.

In the RAM 9, the image data of the correcting chart to be printed out are formed on the basis of the basic image data of the correcting chart which have been called out by the control part 4 from the ROM 5.

In the image forming apparatus 1 having the above described structure, the image data which are the base of the correcting chart are stored in the ROM 5, and the correcting chart is printed out on the basis of the image data.

In order to correct the density property which has been changed with elapse of time and due to external factors, so that the image data can be printed with proper density property, the user inputs the value which he has confirmed on the printed correcting chart, to the display/operation part 3.

The correction is performed in the correction part 8, on the basis of the value which has been inputted to the display/operation part 3, and therefore, the image forming apparatus 1 will be able to print the image with the proper density property.

Then, a process carried out in the image forming apparatus 1 will be described referring to FIG. 2.

Figure 2:
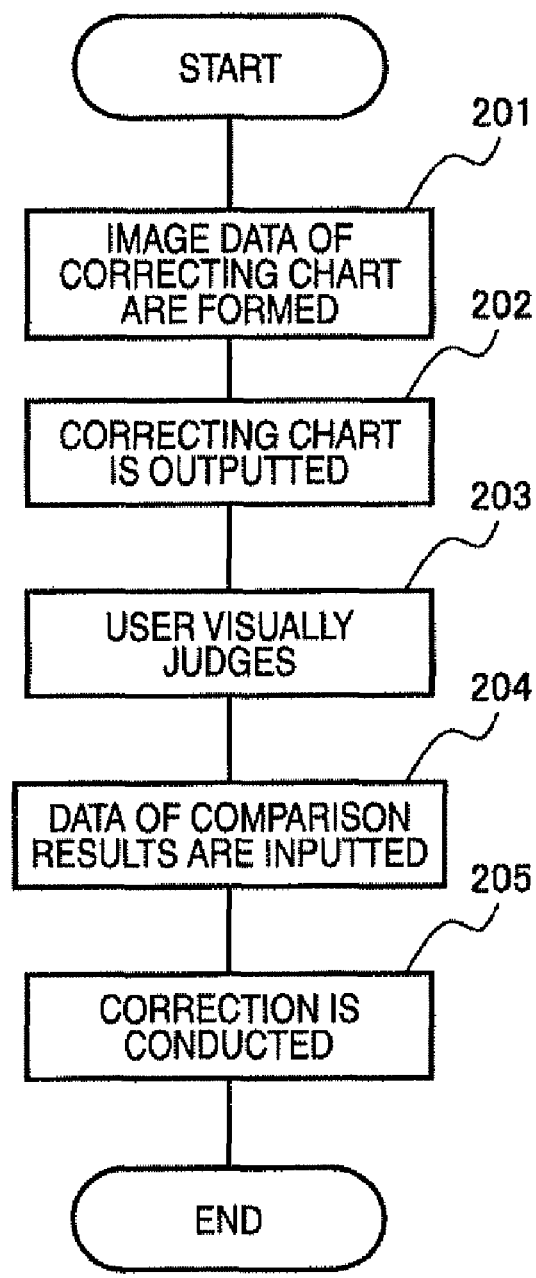
FIG. 2 is a flow chart showing a process carried out in the image forming apparatus 1.

FIG. 2 is a flow chart showing the process carried out in the image forming apparatus 1.

In the image forming apparatus 1 in which the density property at a time of printing has been changed with elapse of time and due to external factors, printing of a correcting chart is ordered by a user.

In the image forming apparatus 1 in which printing of the correcting chart has been ordered, the control part 4 forms image data of the correcting chart in the RAM 9, on the basis of the image data which have been stored in the ROM 5 (Step 201), and the correction chart is outputted from the print engine 6 (Step 202).

The user visually observes the correcting chart which has been printed out, and selects a tone pattern which is the closest in color to a reference pattern having low screen ruling (Step 203), and then, inputs a numerical value of the tone pattern to the display/operation part 3 (Step 204) (in case where the tone correction is conducted).

Alternatively, in case where correction of gray balance is conducted in the image forming apparatus 1, the user visually observes the correcting chart which has been printed out, and selects a pattern of process black which is the closest to the color of a black pattern printed in an ink K (Step 203), and then, inputs the value of the process black pattern to the display/operation part 3 (Step 204) (in case where the gray balance correction is conducted).

Then, the tone or the gray balance is corrected on the basis of the inputted value, in the correction part 8 of the image forming apparatus 1 (Step 205).

In case where the tone correction is conducted, the correcting chart printed out from the image forming apparatus 1 is the chart for the tone correction, and in case where the gray balance correction is conducted, the correcting chart printed out from the image forming apparatus 1 is the chart for the gray balance correction.

Then, tone correcting operation in the correction part 8 will be described referring to FIGS. 3(a) to 3(f).

Figure 3A:
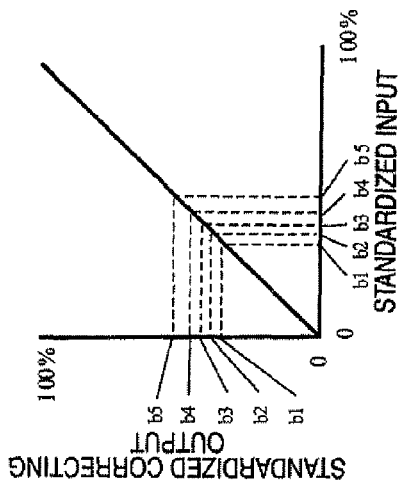
FIGS. 3A-3F are graphs for explaining tone correcting operation in a correction part 8.

FIG. 3(a) is a graph showing density property of the print engine in which an axis of ordinate represents values of the outputted density, and an axis of abscissas represents values of the inputted data. A curve of reference numeral 301 in FIG. 3(a) shows the density property of the image which has been printed with high screen ruling, and a curve of reference number 302 in FIG. 3(a) shows the density property of low screen ruling to be used as the reference. A curve of reference numeral 303 in FIG. 3(d) shows the density property in case where the image has been printed in a high screen ruling pattern, when the density of the print engine is changed. In this graph, the curve 303 is moved to a lower right, and grows thinner than the initial curve 301. On the other hand, the density property of the low screen ruling is kept as the curve 302, and is unlikely to be changed.

Figure 3B:
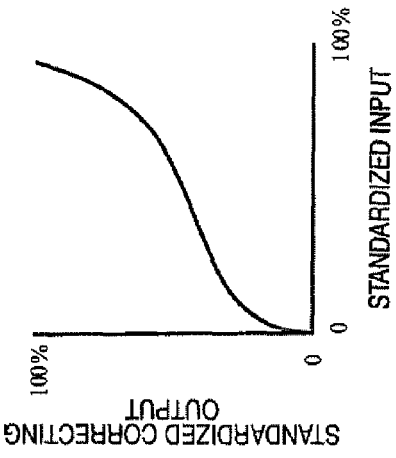

In the initial state, the correction part 8 corrects the tone by passing the image data through the TRC as shown in FIG. 3(b). This TRC is an LUT in such a shape that the axis of ordinates and the axis of abscissas of the density property of the print engine in FIG. 3(a) are exchanged. Specifically, by passing the image data through the TRC of the correction part 8 and the print engine, it is possible to obtain an image having a linear density property on a printed face.

Assuming that tone pattern part of the tone correcting chart is drawn at values b1 to b5, and the reference pattern part is drawn at a value of b3, the correction part 8 will be further described.

Figure 3C:
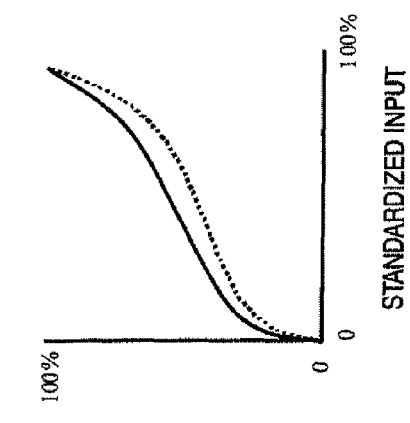
Figure 3D:
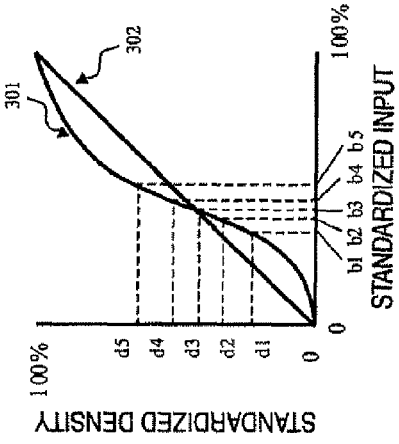
Figure 3E:
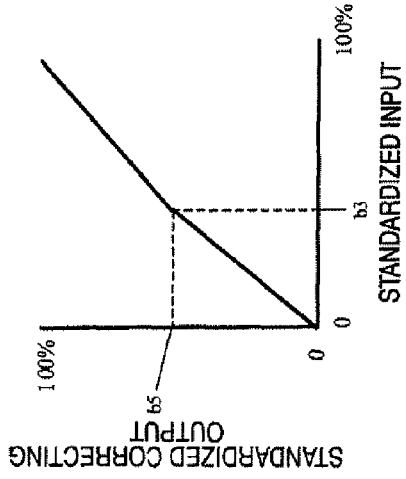
Figure 3F:
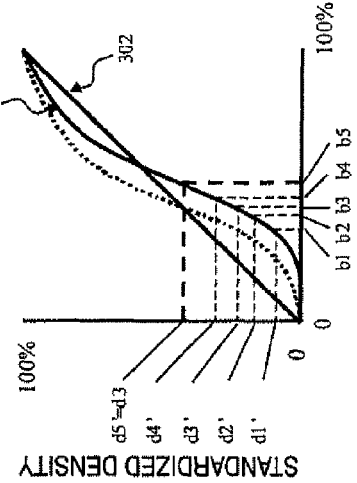

In case where printing of the tone correcting chart is ordered in a state where the density of the print engine is changed as shown in FIG. 3(d), the TRC of the correction part 8 is temporarily exchanged with a linear LUT in which the input value and the output value are the same, as shown in FIG. 3(c). The tone correcting chart passes through the correction part 8, and printed in the print engine part with densities d1' to d5' corresponding to The values b1 to b5. The reference pattern is printed with density d3 (d5') corresponding to the input at b3, since the density is not changed. The user selects the tone pattern of the input at b3 which has the same density as the reference pattern, and inputs the value to the display/operation part 3. Receiving an order from the display/operation part 3, the correction part 8 determines a correcting point at which b3 is converted to b5, as shown in FIG. 3(e), and connects this point to a point at 100% of a starting point thereby to create a tone correcting LUT. By passing the TRC of FIG. 3(b) through this LUT, a corrected TRC as shown in FIG. 3(f) is created. The correction part 8 keeps on using the corrected TRC in FIG. 3(f) in the succeeding ordinary printing.

By correcting the original TRC in this manner, it is possible to print the image with the linear density property, even though the density of the print engine is changed.

In case where the tone is corrected by outputting respective charts corresponding to three kinds of densities, namely, High (high density), Middle (middle density), and Low (low density), three correcting points are determined with respect to three kinds of the charts, in the same manner as described above. These three points are connected to the point at 100% of the starting point, thereby to create the tone correcting LUT, and by passing the TRC through the LUT, a corrected TRC is created.

In case where the gray balance is corrected, corrected TRCs are created for respective colors C (cyan), M (magenta) and Y (yellow), whereby the gray balance can be corrected.

Then, various correcting charts which are printed out from the image forming apparatus 1 will be described in Exemplary embodiments 1 to 7.

Exemplary Embodiment 1

In the first exemplary embodiment, the correcting chart for correcting the tone which is printed out from the image forming apparatus 1 will be described.

On the basis of the image data stored in the ROM 5 of the image forming apparatus 1, correcting charts as shown in FIG. 4 are printed out.

Figure 4A:
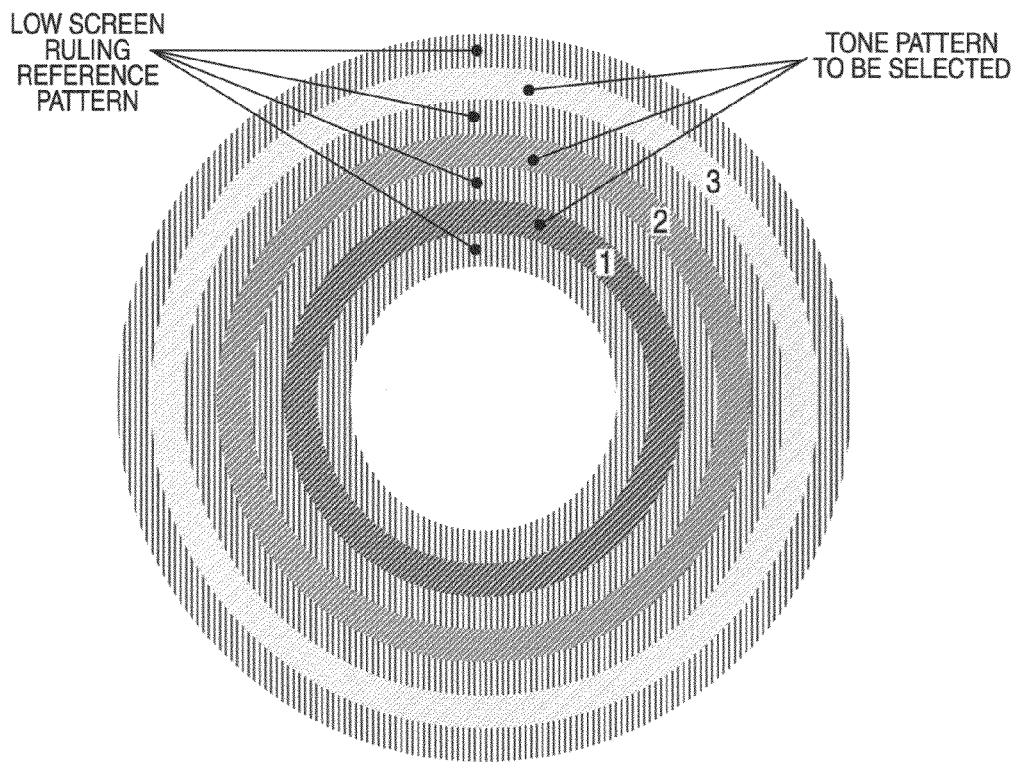
FIGS. 4A-4B are schematic views showing correcting charts formed in a shape of concentric circle.
Figure 4B:
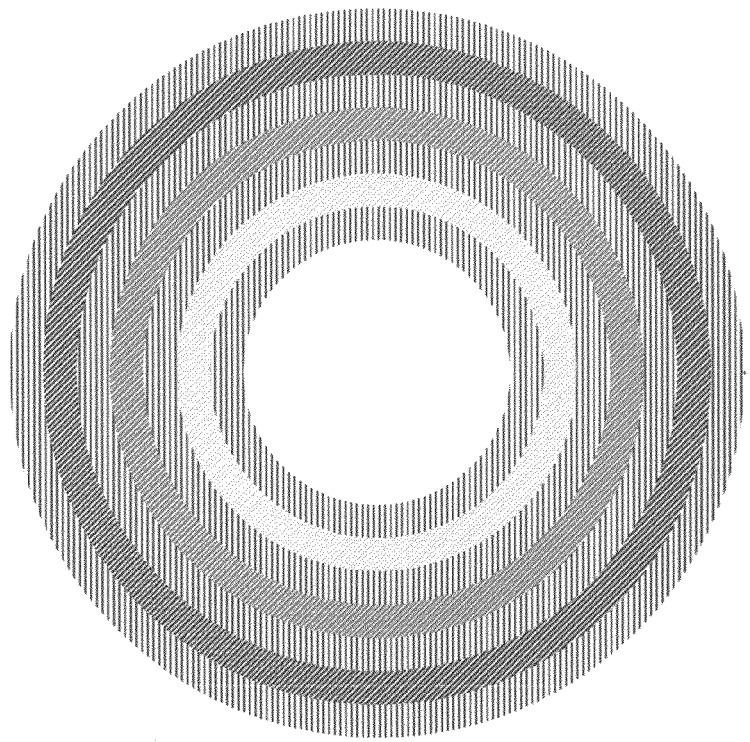

FIG. 4 shows the correcting charts which are printed out from the image forming apparatus 1, of which FIG. 4(a) is the correcting chart in which density of the tone patterns is gradually reduced from an inner circle to an outer circle, and FIG. 4(b) is the correcting chart in which density of the tone patterns is gradually increased from an inner circle to an outer circle.

As shown in FIG. 4(a), the correcting chart printed out from the image forming apparatus 1 includes reference patterns of low screen ruling and the tone patterns which are alternately arranged in a shape of concentric circle.

The low screen ruling reference pattern is the pattern having the low screen ruling which is relatively unlikely to be subjected to a change of the tone property of the image forming apparatus 1, and the pattern to be used as a reference.

All the low screen ruling reference patterns have the same density on the correcting chart, as shown in FIG. 4(a), and arranged alternately with the tone patterns, in a shape of concentric circle.

There are the tone patterns having various densities, as shown in FIG. 4(a), and the tone patterns are arranged alternately with the low screen ruling reference patterns in a shape of concentric circle.

Moreover, as shown in FIG. 4(a), for facilitating comparison with the densities of the tone patterns positioned at an inner end and at an outer end, the low screen ruling reference patterns are arranged at the innermost side and the outermost side of the correcting chart. Further, the low screen ruling reference pattern at the innermost side may be formed in a round shape.

Because the low screen ruling reference patterns and the tone patterns are alternately arranged in a shape of concentric circle, angles at which the low screen ruling reference patterns and the tone patterns are contacted with each other exist in all over directions. In other words, the low screen ruling reference patterns and the tone patterns are adjacent to each other at every angle.

Moreover, the tone patterns having different densities are arranged in such a manner that the density is gradually reduced from an inside to an outside, as shown in FIG. 4(a) (or in such a manner that the density is gradually increased from the inside to the outside).

The user visually observes this correcting chart (FIG. 4(a)), and selects the tone pattern having the same density as the low screen ruling reference pattern.

Then, a value of the selected one of the tone patterns is inputted to the display/operation part 3, and the tone is corrected in the correction part 8, on the basis of the inputted value of the tone pattern.

In the first exemplary embodiment, not only the correcting chart in which the density of the tone patterns is gradually reduced from the inside to the outside as shown in FIG. 4(a), but also the correcting chart in which the density of the tone patterns is gradually increased from the inside to the outside as shown in FIG. 4(b) may be printed out together from the image forming apparatus 1, as the correcting charts.

The correcting chart as shown in FIG. 4(b) is the same as the correcting chart as shown in FIG. 4(a) in that the low screen ruling reference patterns and the tone patterns having various densities are alternately arranged in a shape of concentric circle, the low screen ruling reference patterns and the tone patterns are adjacent to each other at every angle, and the low screen ruling reference patterns are arranged at the innermost side and at the outermost side.

However, unlike the correcting chart as shown in FIG. 4(a), in the correcting chart as shown in FIG. 4(b), the tone patterns are arranged in such a manner that the density is gradually increased from the inside to the outside of the concentric circle.

The user selects the tone patterns which appear to have the same density, respectively from the two charts, the correcting chart in which the density of the tone patterns is gradually reduced from the inside to the outside (FIG. 4(a)), and the correcting chart in which the density of the tone patterns is gradually increased from the inside to the outside (FIG. 4(b)).

Then, the respective values of the selected tone patterns are inputted to the display/operation part 3, and the tone correction is carried out in the correction part 8 of the image forming apparatus 1, on the basis of an average value of the inputted two values of the tone patterns.

Because the two types of the correcting charts are used in this manner, erroneous selection by human visual observation can be decreased, and more accurate correction can be performed.

Exemplary Embodiment 2

In the second exemplary embodiment, the correcting chart for tone correction which is printed out from the image forming apparatus 1 will be described.

Figure 5:
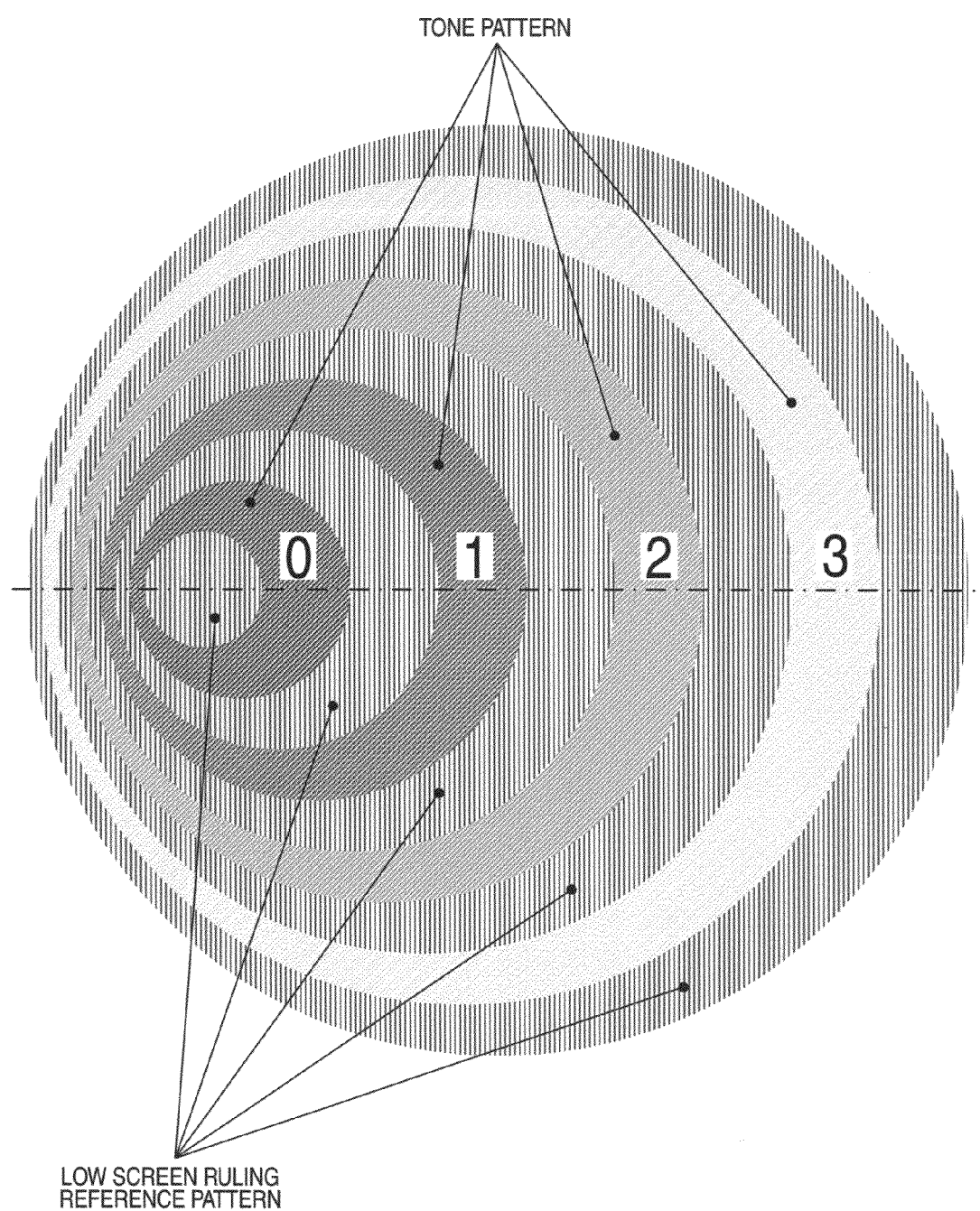
FIG. 5 is a schematic view showing a correcting chart formed of eccentric circles.
Figure 6:
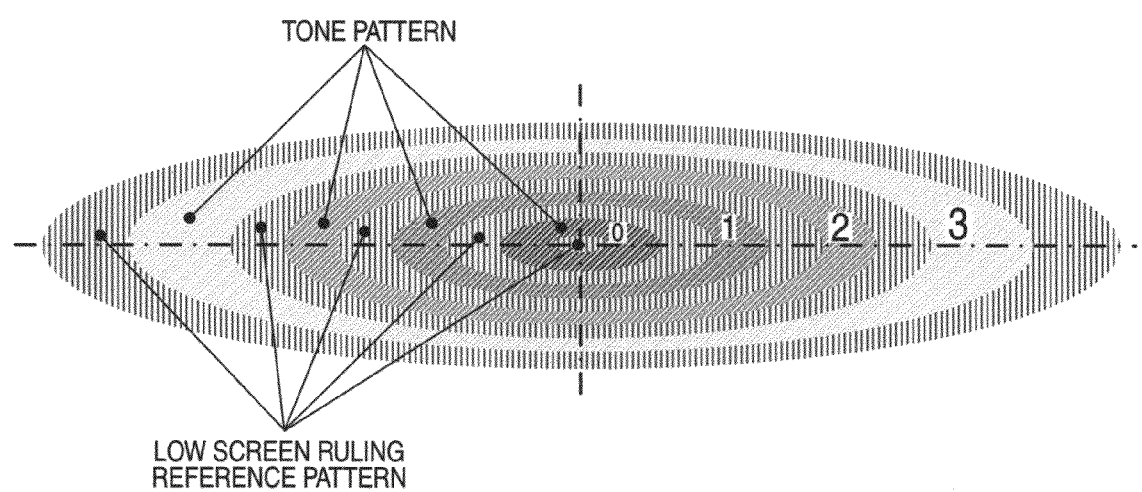
FIG. 6 is a schematic view showing a correcting chart formed in a shape of ellipse.

On the basis of the image data stored in the ROM 5 of the image forming apparatus 1, correcting charts as shown in FIG. 5 or FIG. 6 are printed out.

FIG. 5 is a schematic view showing the correcting chart which is printed out from the image forming apparatus 1.

In the second exemplary embodiment, in the correcting chart which is printed out from the image forming apparatus 1, regions of the low screen ruling reference patterns and regions of the tone patterns are formed as plural of circles whose centers are offset, as shown in FIG. 5.

Moreover, the regions of the low screen ruling reference patterns in a ring-like shape and the regions of the tone patterns in a ring-like shape are alternately arranged having their boarder lines contacted with each other.

FIG. 6 is a schematic view showing the correcting chart which is printed out from the image forming apparatus 1.

In the second exemplary embodiment, the correcting chart in which the regions of the low screen ruling reference patterns and the regions of the tone patterns in a ring-like shape are formed as a group of ellipses having the same center, as shown in FIG. 6, is printed out, as the correcting chart which is printed out from the image forming apparatus 1.

Because the correcting chart is printed out in this manner, the borders between the regions of the low screen ruling reference patterns and the regions of the tone patterns have all the directions, it will be easy to compare colors in the regions of the low screen ruling reference patterns with colors in the regions of the tone patterns.

Moreover, in the correcting chart of this type, the direction in which the density of the tone patterns is changed and the direction of the borders are substantially perpendicular to each other, and therefore, it will be easy to compare the colors in the regions of the low screen ruling reference patterns with the colors in the regions of the tone patterns.

Further, in the correcting charts as shown in FIGS. 5 and 6, a range of spatial frequency in which vision characteristic is sharp is contained, because the respective regions are continuously varied in width.

Figure 7A:
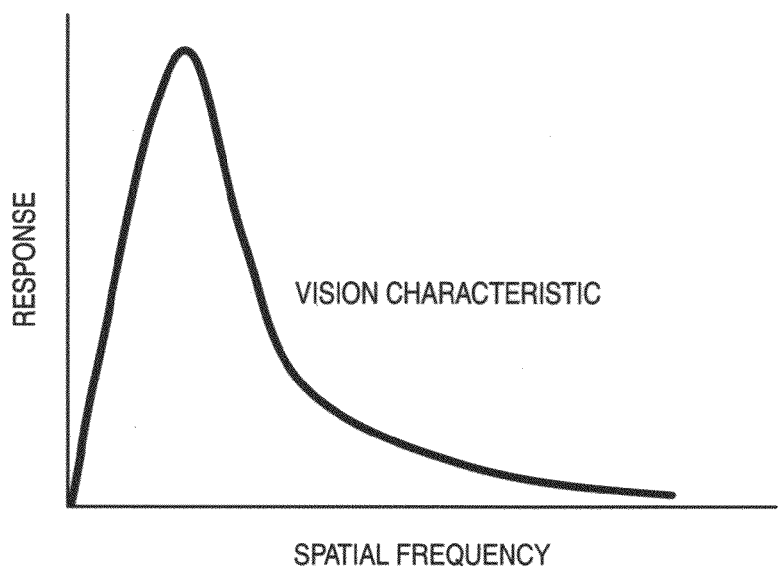
FIGS. 7A-B are graphs showing spatial frequency of vision characteristic.
Figure 7B:
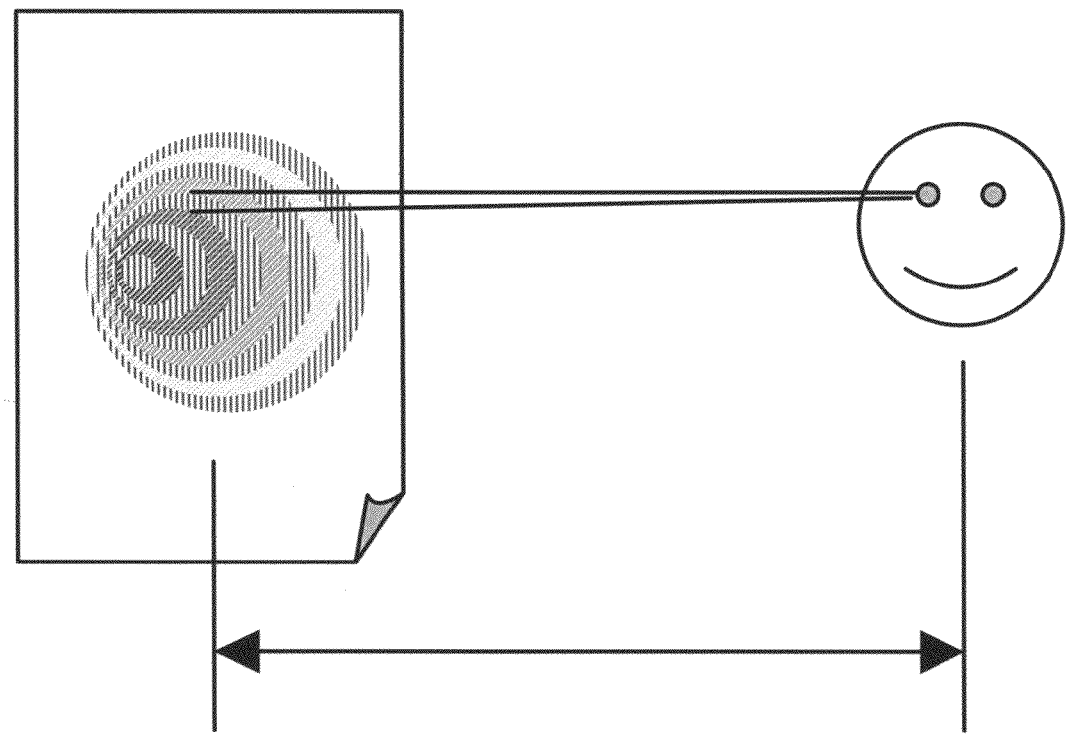

As shown in FIG. 7(a), the vision characteristic of human being has such tendency that response is variable, depending on the spatial frequency, and his vision becomes more sensitive in a range of particular frequency. When this characteristic is applied to the correcting chart, the spatial frequency is determined depending on widths of the regions of the low screen ruling reference patterns and the regions of the tone patterns, and a distance at which the user observes the chart, as shown in FIG. 7(b). In the correcting charts which have been described referring to FIGS. 5 and 6, the widths of the respective regions are continuously varied, and hence, the spatial frequency too is continuously varied. Therefore, the spatial frequency where visual response is the highest inevitably exists in the correcting chart, and hence, an interval where comparison can be easily made exists without fail.

The image data of the correcting charts which have been described referring to FIGS. 5 and 6 are stored in the ROM 5, and printed out, when an order for printing the correcting chart is issued.

The user prints out the correcting chart which has been described referring to FIG. 5 or 6 from the image forming apparatus 1, selects the tone pattern which appears to be equal to the low screen ruling reference pattern from the correcting chart, and inputs a value of the selected tone pattern to the display/operation part 3.

When the value of the selected tone pattern has been inputted to the display/operation part 3, the tone correction is carried out in the correction part 8 of the image forming apparatus 1, on the basis of the inputted value of the tone pattern.

Exemplary Embodiment 3

In the third exemplary embodiment, the correcting chart for tone correction which is printed out from the image forming apparatus 1 will be described.

Figure 8:
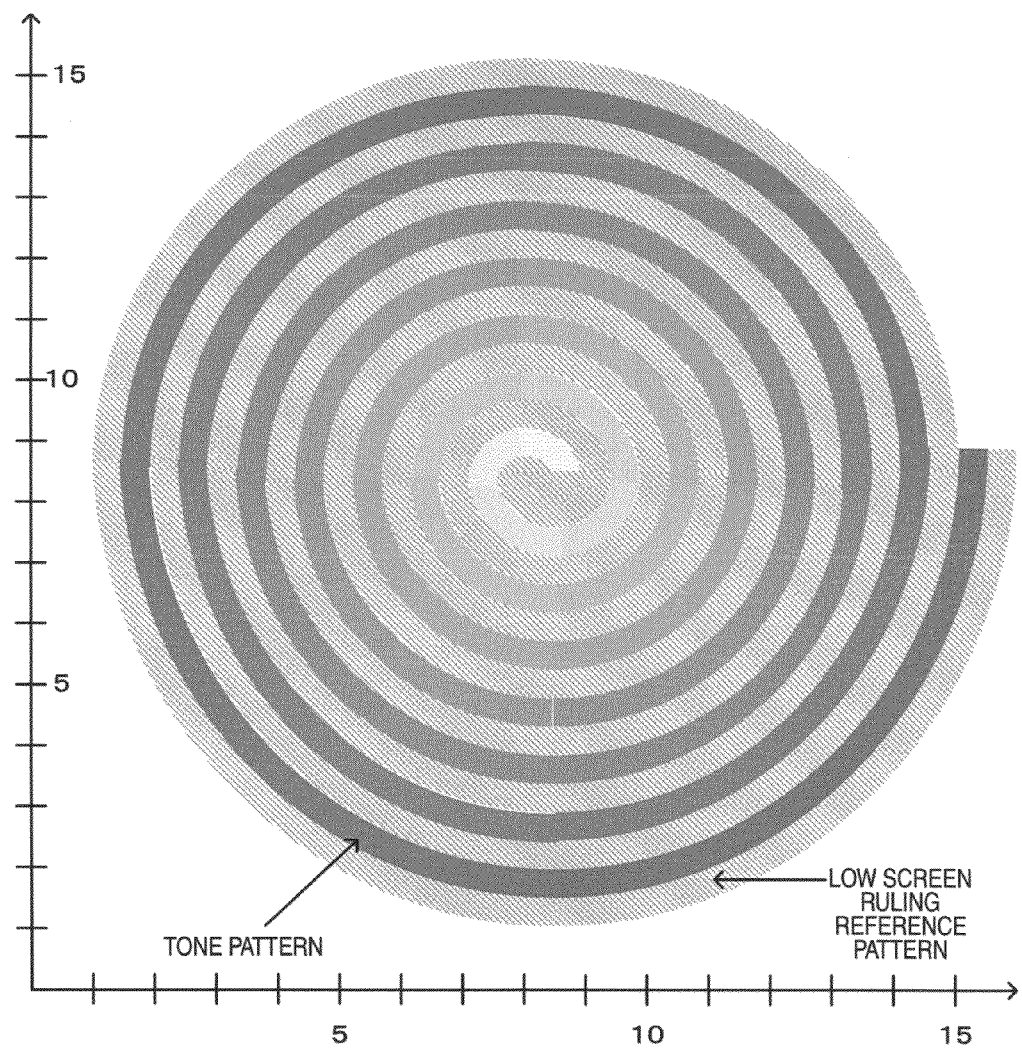
FIG. 8 is a schematic view showing a correcting chart formed of coils.
Figure 9:
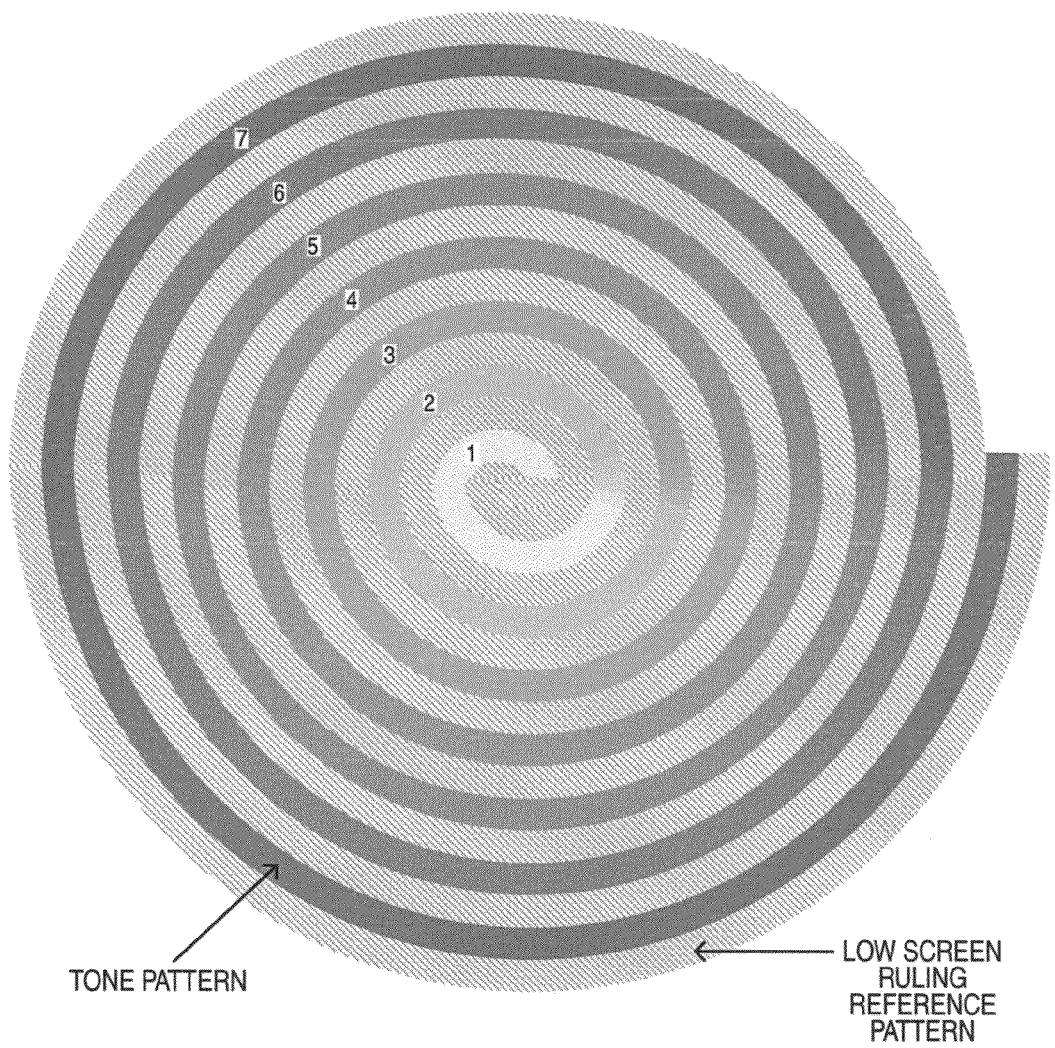
FIG. 9 is a schematic view showing a correcting chart formed of coils in which density is dispersedly varied.
Figure 10:
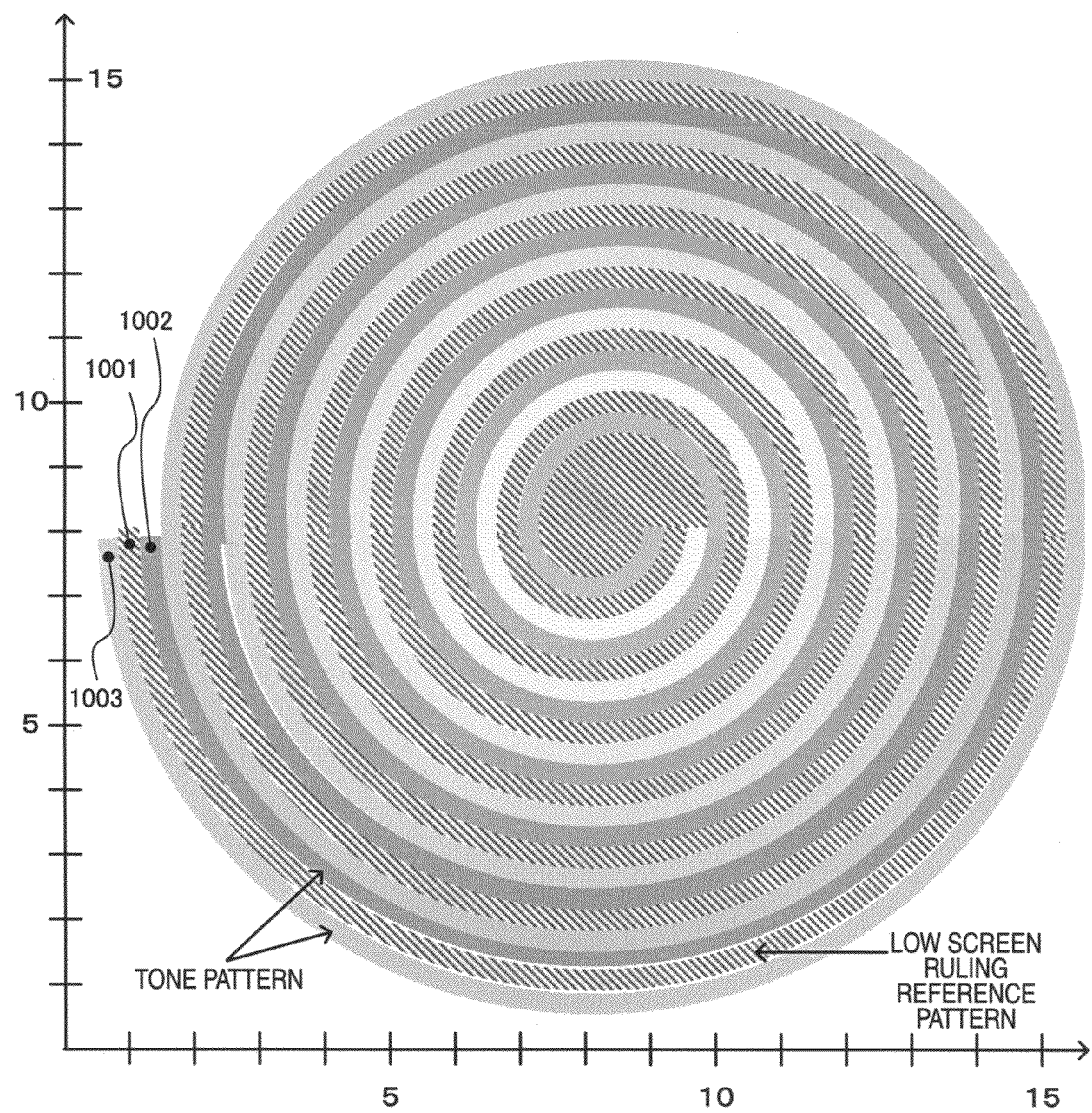
FIG. 10 is a correction chart formed of coils in which patterns having low density and high density are shown as tone patterns.

On the basis of the image data stored in the ROM 5 of the image forming apparatus 1, the correcting chart as shown in FIG. 8, 9 or 10 is printed out.

FIG. 8 is a schematic view showing the correcting chart which is printed out from the image forming apparatus 1.

The correcting chart will be described referring to FIG. 8.

In the third exemplary embodiment, in the correcting chart which is printed out from the image forming apparatus 1, the region of the low screen ruling reference pattern and the region of the tone pattern are formed in a shape of double coils, as shown in FIG. 8.

One of the coils is the region of the reference pattern which is drawn by a screen having low screen ruling which is resistant against density change, and the other coil is the region of the tone pattern for correcting the tone.

In the region of the reference pattern which is drawn by the screen having low screen ruling, the tone is not varied from a starting end to a terminal end of the coil.

In the region of the tone pattern for correcting the tone, the tone is continuously varied from a starting end to a terminal end of the coil. This region is so formed that the tone is gradually increased from the starting end (an inside) to the terminal end (an outside) of the coil.

Moreover, in the correcting chart, an X-axis and a Y-axis for indicating positions on the double coils on an X-Y coordinate are shown together with the double coils, as shown in FIG. 8.

The double coils are formed on the X-Y coordinate, and data of the double coils are stored in the ROM 5 so that the density of the tone pattern at a certain position may be made apparent, provided that the X-Y coordinate of the position is defined.

As the correcting chart as shown in FIG. 8, three types of the charts having the reference patterns of different densities corresponding to the densities of High (high density), Middle (middle density), and Low (low density) are printed out.

The user who has printed out the correcting charts selects a value of the region on the coordinate where the tone pattern and the reference pattern of the low screen ruling which are arranged adjacent to each other appear to have the same density.

In case where the tone pattern is dispersedly varied, it sometimes happens that the region where the reference pattern and the tone pattern which are arranged adjacent to each other appear to have the same density does not exist on the chart. However, in case where the tone pattern is continuously varied, the region where they appear to have the same density is inevitably contained in the chart. Therefore, the user can more easily select the region where they appear to have the same density, in case where the tone pattern is continuously varied than in case where the tone is dispersedly varied.

FIG. 9 too is a schematic view showing a correcting chart which is printed out from the image forming apparatus 1. The correcting chart will be described referring to FIG. 9.

As shown in FIG. 9, in the correcting chart which is printed out from the image forming apparatus 1, the region of the low screen ruling reference pattern and the region of the tone pattern are formed in a shape of double coils, in the same manner as the correcting chart which has been described referring to FIG. 8.

One of the coils is the region of the reference pattern which is drawn by a screen having low screen ruling which is resistant against density change, and the other coil is the region of the tone pattern for correcting the tone.

In the region of the reference pattern which is drawn by the screen having low screen ruling, the tone is not varied from a starting end to a terminal end of the coil.

In the region of the tone pattern for correcting the tone, the tone is dispersedly varied in such a manner that the tone is varied at every cycle of the coil from the starting end to the terminal end of the coil. Specifically, in the correcting chart as shown in FIG. 9, the region of the tone pattern is formed with the same tone in an area of a first cycle of the coil, similarly, the region in an area of a second cycle is equally formed with different tone from the first cycle, and the region in a third cycle is equally formed with different tone from the second cycle. In this manner, the region of the tone pattern in the correcting chart as shown in FIG. 9 is so formed that the tone is gradually increased from the starting end (an inside) to the terminal end (an outside) of the coil.

Moreover, the correcting chart as shown in FIG. 9 is provided with numbers for selecting respective densities of the tone pattern, in the same manner as in FIG. 4. The user selects the region of the tone having the same density as the region of the low screen ruling reference pattern, and selects the value of the region. In the correcting chart as shown in FIG. 8, for the purpose of defining the coordinate, it is necessary to confirm the X, Y axes, by diverting eyes from the regions which appear to be the same. However, in the chart as shown in FIG. 9, it is possible to define the value, by tracing the coil from the region which appears to be the same, because the density is the same along one cycle.

In the correcting chart as shown in FIG. 9, three types of the charts having the reference patterns of different densities corresponding to the densities of High (high density), Middle (middle density), and Low (low density) are printed out.

FIG. 10 too is a schematic view showing a correcting chart which is printed out from the image forming apparatus 1.

The correcting chart will be described referring to FIG. 10.

The correcting chart as shown in FIG. 10 includes a region of a tone pattern having low density (reference numeral 1003), a region of low screen ruling reference pattern (reference numeral 1001), and a region of a tone pattern having high density (reference numeral 1002) which are formed in a shape of triple coils.

On of the coils is a region of a low screen ruling reference pattern to be used as a color sample which is drawn by the screen of low screen ruling which is resistant against density change.

The other two coils are so formed as to sandwich the coil of the low screen ruling reference pattern between them from both sides.

Because the triple coils are formed in such a manner that the tone pattern of low density and the tone pattern of high density sandwich the region of the low screen ruling reference pattern between them from the both sides, both the regions of the tone pattern of low density and the tone pattern of high density are in contact with the low screen ruling reference pattern.

In the correcting chart as shown in FIG. 10, there are increased regions of the tone patterns which can be compared with the reference pattern, as compared with the charts as shown in FIGS. 8 and 9, and accordingly, it is possible to take a wider range of the tone which is used in the tone pattern than in the charts as shown in FIGS. 8, 9. Moreover, by taking the same range of the tone as in the charts as shown in FIGS. 8, 9, it would be possible to select the density more precisely within the same range of the tone.

Moreover, in the correcting chart as shown in FIG. 10, an X-axis and a Y-axis for indicating positions on the triple coils on the X-Y coordinate are shown together with the triple coils, in the same manner as in the correcting chart which has been described referring to FIG. 8. The user selects the region of the tone pattern having the same density as the region of the low screen ruling reference pattern, and selects the X, Y coordinates of the selected region.

The triple coils as shown in FIG. 10 are formed on the X-Y coordinate, and data of the triple coils are stored in the ROM 5 so that a value of the tone pattern (density) at a certain position can be made apparent, provided that the X-Y coordinate of the position is defined.

In the correcting chart of the triple coils which has been described referring to FIG. 10, it is also possible to form the regions of the tone patterns in such a manner that the tone may be dispersedly increased but not continuously, in the same manner as the correcting chart which has been described referring to FIG. 9.

The image data of the correcting charts which have been described referring to FIGS. 8, 9 and 10 are stored in the ROM 5, and printed out when printing of the correcting chart is ordered.

Then, process for correcting the tone in the image forming apparatus 1, using the correcting charts which have been described referring to FIGS. 8, 9 and 10, will be described referring to FIG. 11.

Figure 11:
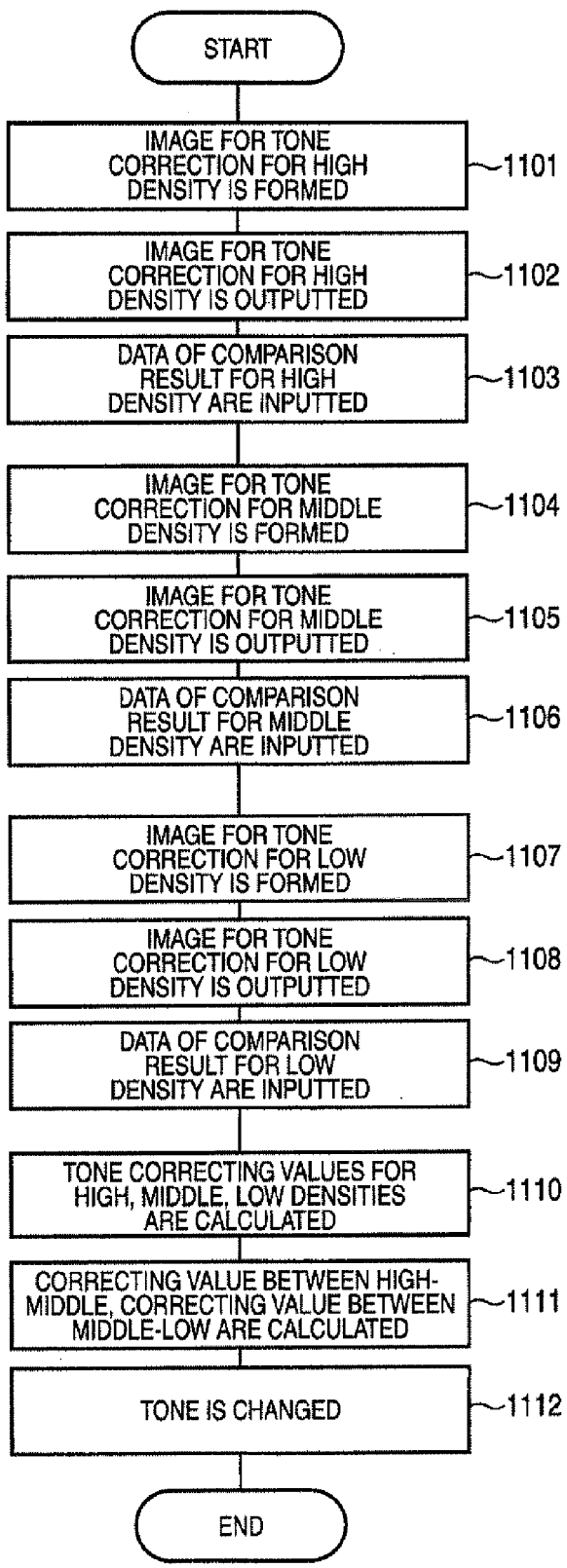
FIG. 11 is a flow chart showing tone correcting process in the image forming apparatus 1.

FIG. 11 is a flow chart showing the process for correcting the tone in the image forming apparatus 1, using the correcting charts which have been described referring to FIGS. 8, 9 and 10.

As shown in FIG. 11, as a first Step, the correcting chart for high density out of the correcting charts which have been described referring to FIGS. 8, 9 and 10 is formed in the RAM 4, on the basis of the image data which are stored in the RAM 5 (Step 1101), and the correcting chart for the high density is printed out (Step 1102).

From the correcting chart which has been printed out, the user selects the tone pattern having the same density as the region of the low screen ruling reference pattern, and inputs the X, Y coordinates of the selected position or the appended values to the display/operation part 3 (Step 1103).

Then, the correcting chart for middle density out of the correcting charts which have been described referring to FIGS. 8, 9 and 10 is formed in the RAM 4, on the basis of the image data which are stored in the ROM 5 (Step 1104), and the correcting chart for the middle density is printed out (Step 1105).

From the correcting chart for the middle density which has been printed out, the user selects the tone pattern having the same density as the region of the low screen ruling reference pattern, and inputs the X, Y coordinates of the selected position or the appended values to the display/operation part 3 of the image forming apparatus 1 (Step 1106).

Then, the correcting chart for low density out of the correcting charts which have been described referring to FIGS. 8, 9 and 10 is formed in the RAM 4, on the basis of the image data which are stored in the ROM 5 (Step 1107), and the correcting chart for the low density is printed out (Step 1108).

From the correcting chart for the low density which has been printed out, the user selects the tone pattern having the same density as the region of the low screen ruling reference pattern, and inputs the X, Y coordinates of the selected position or the appended values to the display/operation part 3 of the image forming apparatus 1 (Step 1109).

When the values which have been respectively selected from the correcting charts for the high density, middle density, and low density are inputted to the display/operation part 3, tone correcting values of the respective densities are calculated in the correction part 8 (Step 1110).

Further, the correcting value between the high density and the middle density, and the correcting value between the middle density and the low density are calculated in the correction part 8 (Step 1111).

In this manner, the calculations are conducted in the correction part 8 to create new LUT functions, and change of the tone is performed (Step 1112).

Exemplary Embodiment 4

The correcting chart which is described in the fourth exemplary embodiment is not used for comparing the low screen ruling pattern, which is the reference density pattern, with the tone pattern, but formed in such a manner that the low screen ruling pattern is firstly compared with a middle screen ruling pattern which is formed with a screed having lower screen ruling than the screen used in the tone pattern and higher screen ruling than the screen used in the low screen ruling pattern, and selected. Then, the middle screen ruling pattern which has been selected here is compared with the tone pattern.

When the low screen ruling pattern is compared with the tone pattern of the screen having high screen ruling, it sometimes happens that a difference is unlikely to be observed due to a large difference in the screen ruling. However, in case where the low screen ruling pattern is compared with the middle screen ruling pattern, and then, the selected middle screen ruling pattern is compared with the tone pattern, the difference in the screen ruling between the compared patterns becomes smaller.

A process for comparing in two steps in this manner will be described referring to FIG. 12.

Figure 12:
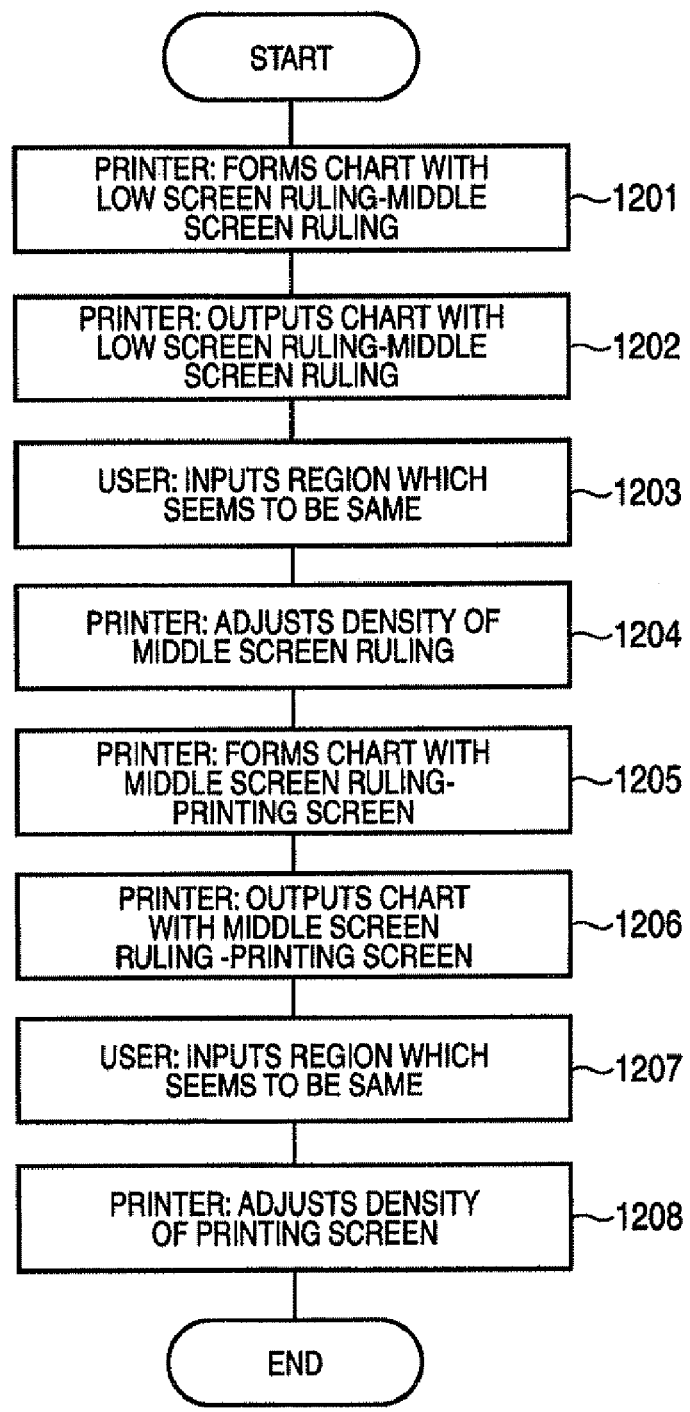
FIG. 12 is a flow chart showing tone correcting process in the image forming apparatus 1.

FIG. 12 is a flow chart showing the process in which correction using the correcting chart is conducted in the two steps.

As a first Step, the correcting chart composed of the low screen ruling pattern and the middle screen ruling pattern is formed in the RAM 9 by the control part 4, on the basis of the image data stored in the ROM 5 (Step 1201), and printed out (Step 1202).

Figure 13:
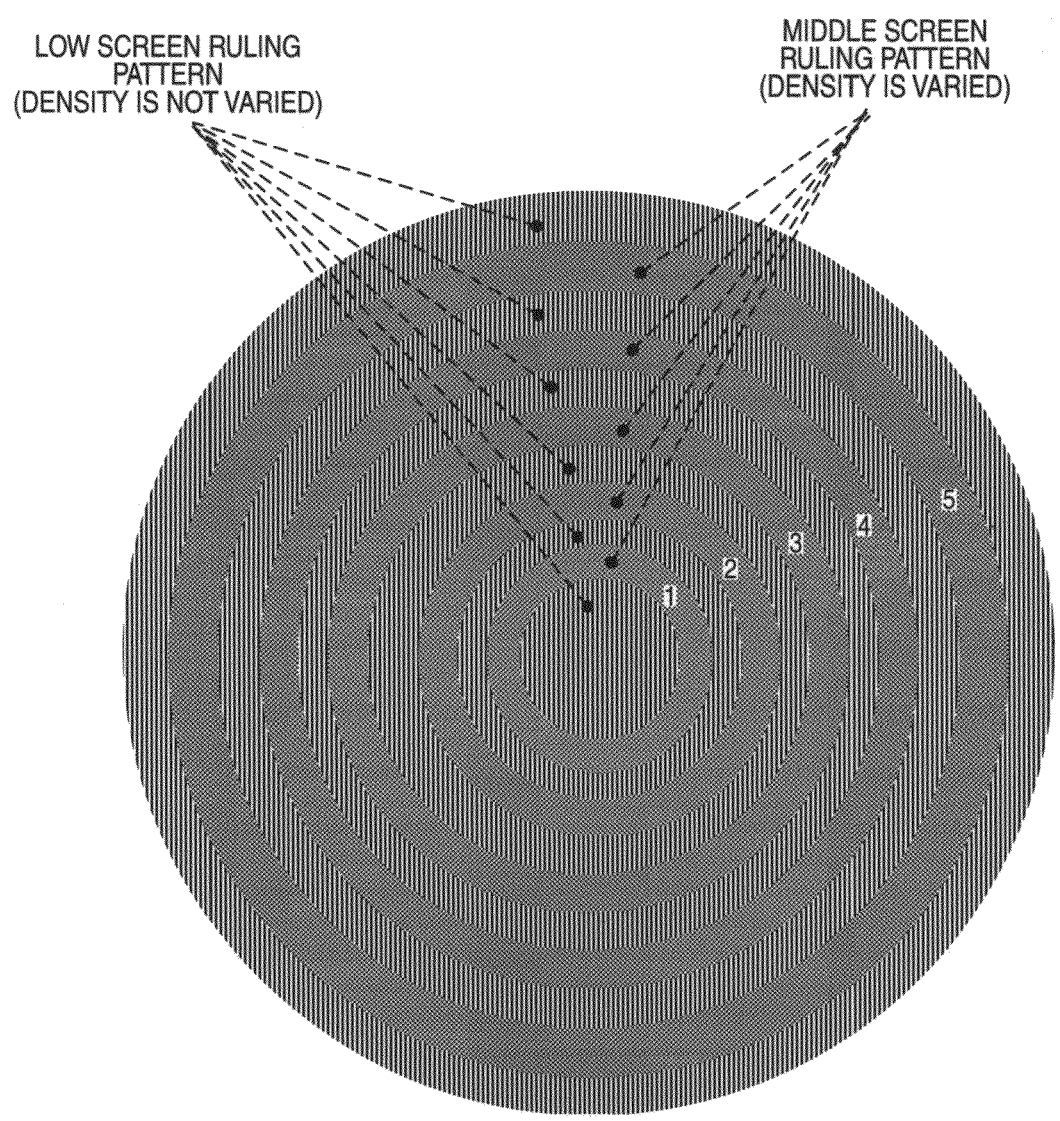
FIG. 13 is a correcting chart in which low screen ruling patterns and middle screen ruling patterns are printed.

The correcting chart in which the low screen ruling pattern and the middle screen ruling pattern are printed includes, as shown in FIG. 13, regions of the low screen ruling patterns where the density is not varied and regions of the middle screen ruling patterns where the density is gradually varied, which are arranged adjacent to each other.

The correcting chart as shown in FIG. 13 is the chart in which the low screen ruling patterns and the middle screen ruling patterns are printed, and the regions are formed in a shape of concentric circle. The region of the low screen ruling pattern, the region of the middle screen ruling pattern having low density, the region of the low screen ruling pattern, the region of the middle screen ruling pattern having rater low density, the region of the low screen ruling pattern, the region of the middle screen ruling pattern having middle density, the region of the low screen ruling pattern, the region of the middle screen ruling pattern having rather high density, the region of the low screen ruling pattern, the region of the middle screen ruling pattern having high density, and the region of the low screen ruling pattern are arranged in this order from an inside to an outside.

The user selects the region of the middle screen ruling pattern which appears to have the same density as the region of the low screen ruling pattern in which the density is not varied, from the correcting chart as shown in FIG. 13.

Then, a value of the selected middle screen ruling pattern is inputted to the display/operation part 3 (Step 1203).

Then, on the basis of the value of the middle screen ruling pattern which has been inputted, the screen having the middle screen ruling is corrected in the correction part 8 (Step 1204).

By making the density of the middle screen ruling pattern which has been selected from the correcting chart composed of the low screen ruling patterns and the middle screen ruling patterns, as the reference density of the middle screen ruling pattern, image data of the correcting chart composed of this middle screen ruling pattern and the tone pattern are formed in the RAM 9 by the control part 4 (Step 1205), and printed (Step 1206).

Figure 14:
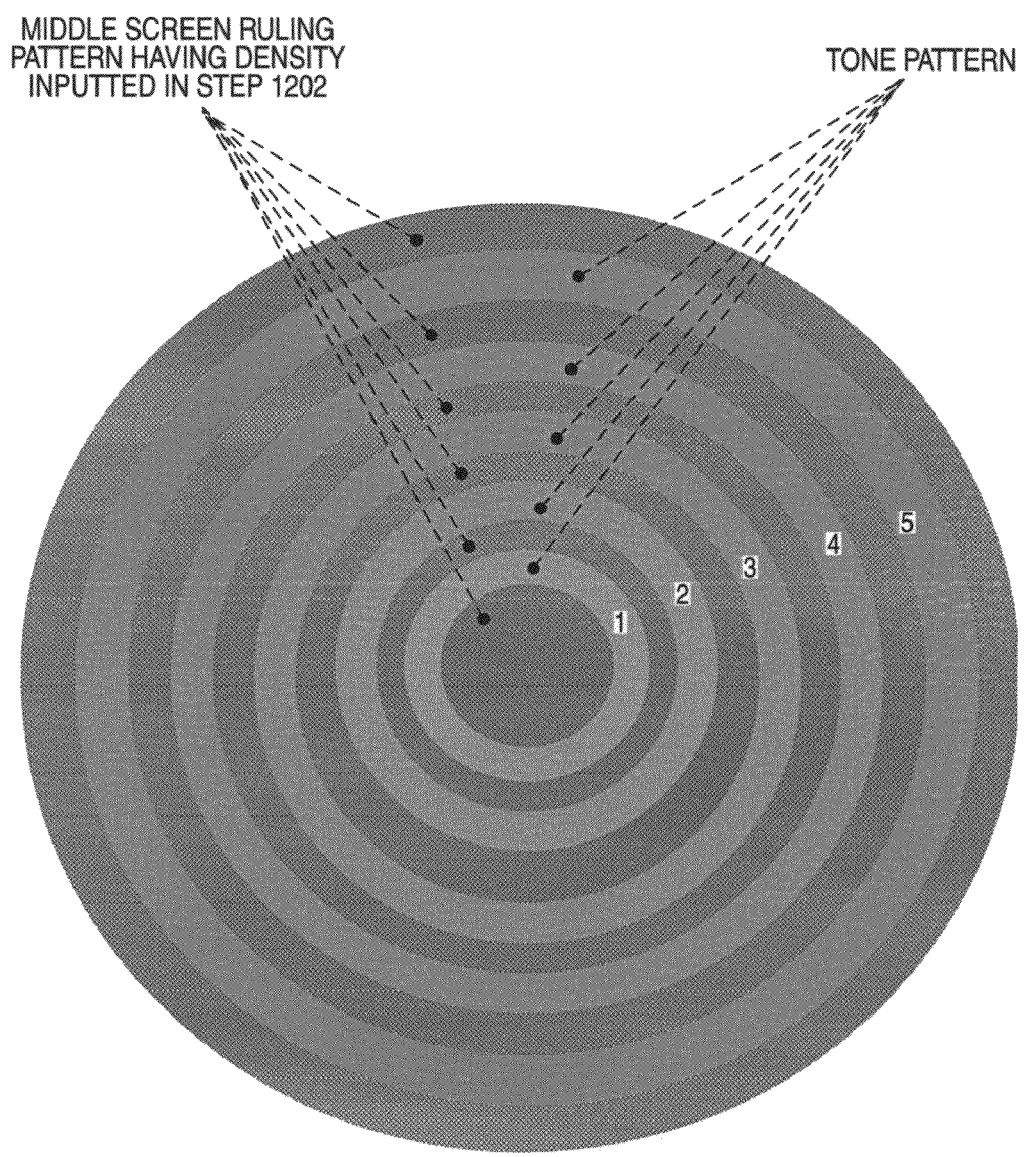
FIG. 14 is a correcting chart in which middle screen ruling patterns and tone patterns are printed.

The correcting chart composed of the middle screen ruling patterns and the tone patterns is formed, as shown in FIG. 14, in such a manner the middle screen ruling pattern as the reference and the tone patterns having high screen ruling are arranged adjacent to each other in a shape of concentric circle.

The middle screen ruling patterns have the density which has been inputted in Step 1202, and the density is constant. On the other hand, the density of the tone patterns is varied from the inside to the outside of the concentric circle.

The user selects the tone pattern which has the same density as color of the middle screen ruling pattern, from the correcting chart including the middle screen ruling patterns and the tone patterns, as shown in FIG. 14, and inputs a value of this tone pattern to the display/operation part 3 (Step 1207).

Then, in the image forming apparatus 1 where the value of the tone pattern has been inputted, the screen having high screen ruling which is the tone pattern is corrected by the correction part 8 (Step 1208).

In this manner, although the correcting chart composed of the low screen ruling patterns and the middle screen ruling patterns is always printed as the same correcting chart, the correcting chart composed of the middle screen ruling patterns and the tone patterns includes the middle screen ruling patterns which have been selected from the correcting chart composed of the low screen ruling patterns and the middle screen ruling patterns, and the tone patterns.

Then, the image data of the correcting chart formed by all combinations of the middle screen ruling patterns and the tone patterns are stored in the ROM 5.

Moreover, the image data of the correcting chart composed of the low screen ruling patterns and the middle screen ruling patterns, which has been firstly printed are also stored in the ROM 5.

In the process which has been described referring to the flow chart in FIG. 12, two sheets of the correcting charts are printed. Now, a process which is carried out using the middle screen ruling pattern on a single sheet of the correcting chart will be described referring to FIGS. 15 and 16.

Figure 15:
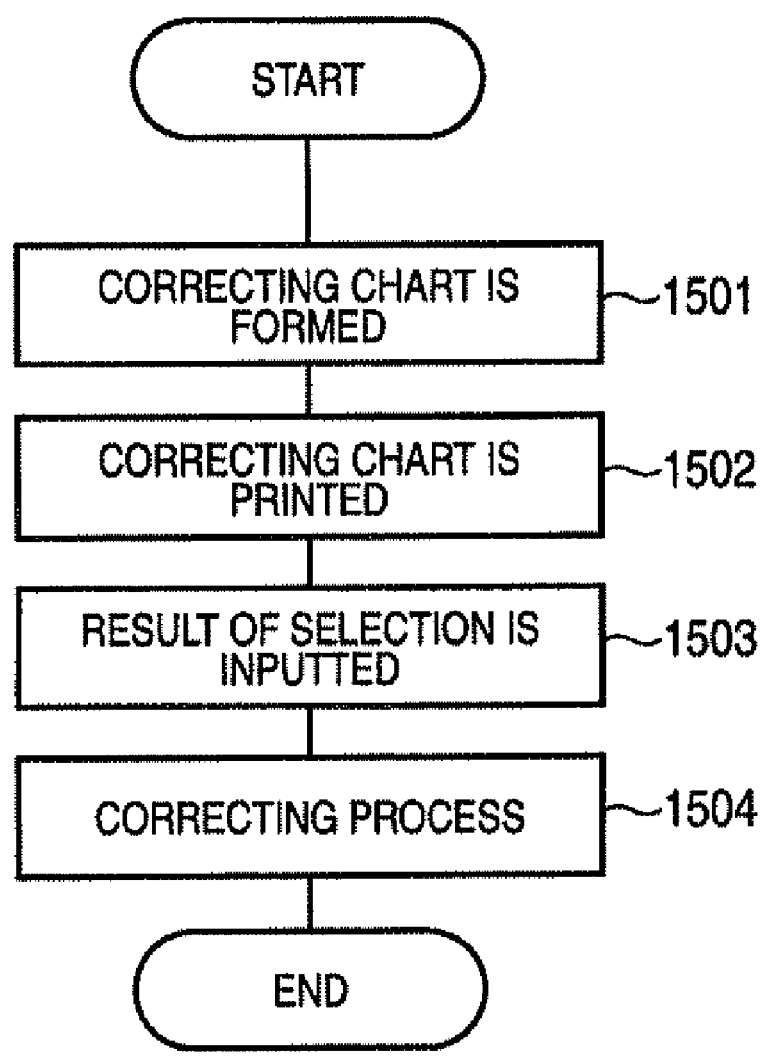
FIG. 15 is a flow chart showing tone correcting process using the low screen ruling patterns on a single sheet of correcting chart.

FIG. 15 is a flow chart showing a process for conducting comparison between the low screen ruling patterns and the middle screen ruling patterns, and comparison between the middle screen ruling patterns and the tone patterns on a single sheet of the correcting chart.

Figure 16:
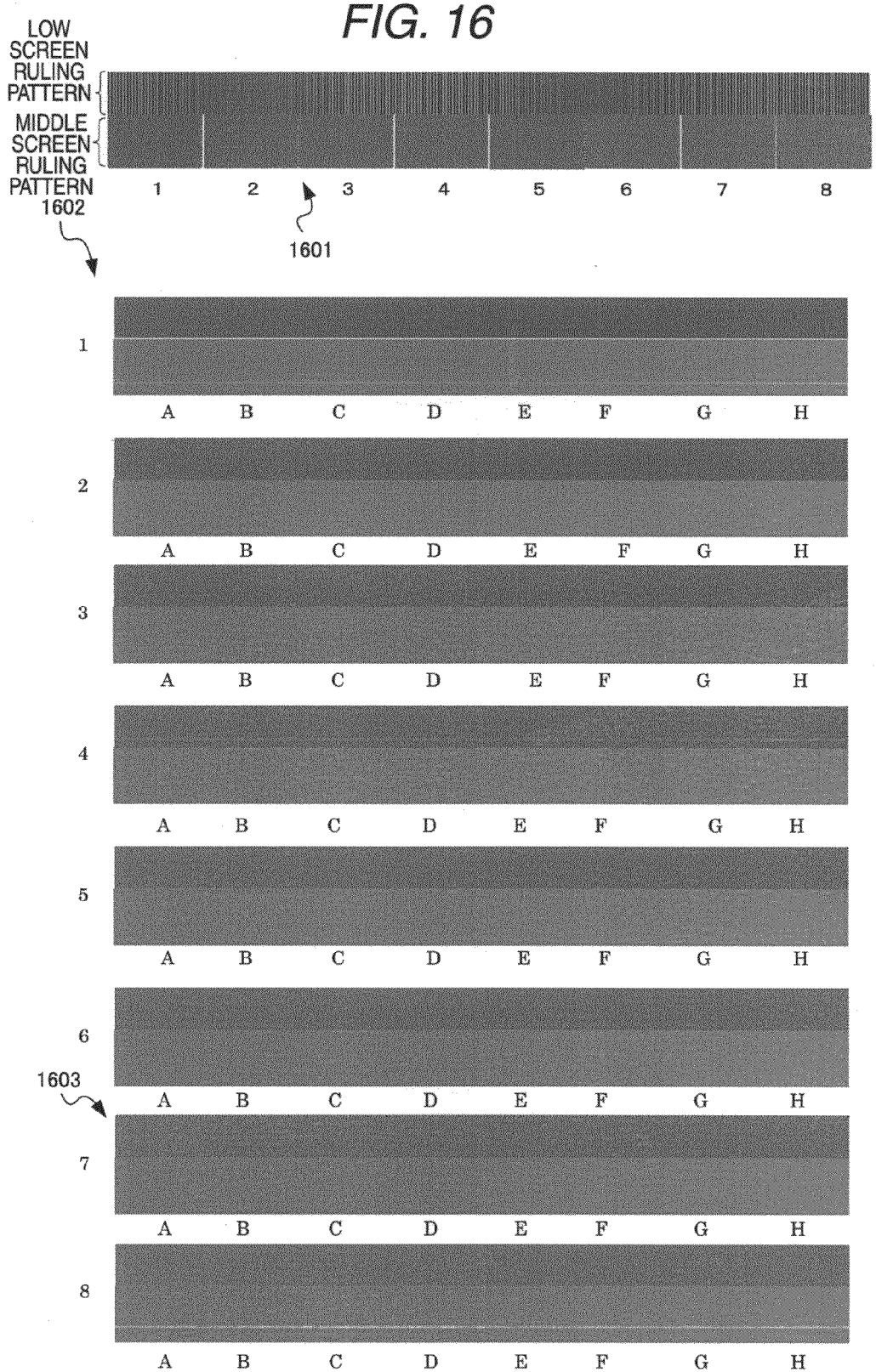
FIG. 16 is a correcting chart for comparing the low screen ruling patterns with the middle screen ruling patterns, and for comparing the middle screen ruling patterns with the tone patterns on a single sheet.

As a first step, the image data which are stored in the ROM 5 for printing the correcting chart as shown in FIG. 16 are formed in the RAM 9 (Step 1501), and printed from the image forming apparatus 1 (Step 1502).

FIG. 16 is the correcting chart in which the comparison between the low screen ruling patterns and the middle screen ruling patterns, and the comparison between the middle screen ruling patterns and the tone patterns can be performed on a single sheet.

The correcting chart as shown in FIG. 16 has a comparing chart (reference numeral 1601) for conducting the comparison between the low screen ruling patterns and the middle screen ruling patterns, in its upper part.

The low screen ruling patterns in this comparing chart are the patterns to be used as a reference for comparison, and the density is not varied. On the other hand, the middle screen ruling patterns have different densities.

The middle screen ruling patterns have lower screen ruling than the tone patterns which are printed in the screen having high screen ruling, similarly to the other middle screen ruling patterns, but composed of screens having higher screen ruling than screen ruling of the low screen ruling pattern to be used as the reference.

Moreover, in the correcting chart as shown in FIG. 16, there is shown a comparing chart (reference numeral 1602) for comparing the tone patterns with the middle screen ruling patterns which can be selected from the comparing chart (reference numeral 1601) composed of the low screen ruling patterns and the middle screen ruling patterns. The tone patterns are formed in screens having higher screen ruling than the middle screen ruling patterns, and printed.

For example, the user selects the screen having middle screen ruling of No. 7 in the comparing chart 1601 in FIG. 16, as the middle screen ruling pattern which appears to have the same density as the low screen ruling pattern as the reference, from the comparing chart composed of the low screen ruling patterns and the middle screen ruling patterns.

Next, the user selects the tone pattern which appears to be the same, from a comparing chart (reference numeral 1603) for comparing the tone patterns with the middle screen ruling patterns of No. 7.

Then, the user inputs the tone pattern which has been selected from the printed correcting chart, to the display/operation part 3.

The input of the selected tone pattern to the display/operation part 3 is performed by inputting the number assigned to the tone pattern which has been selected from the correcting chart.

When the display/operation part 3 has received the selected tone pattern from the user, the correction part 8 corrects the tone, on the basis of the received value (Step 1504).

Image data of the correcting chart which has been described referring to FIG. 16 are stored in the ROM 5 of the image forming apparatus 1.

Exemplary Embodiment 5

In the fifth exemplary embodiment, the correcting chart for gray balance which is printed out from the image forming apparatus 1 will be described.

Figure 17A:
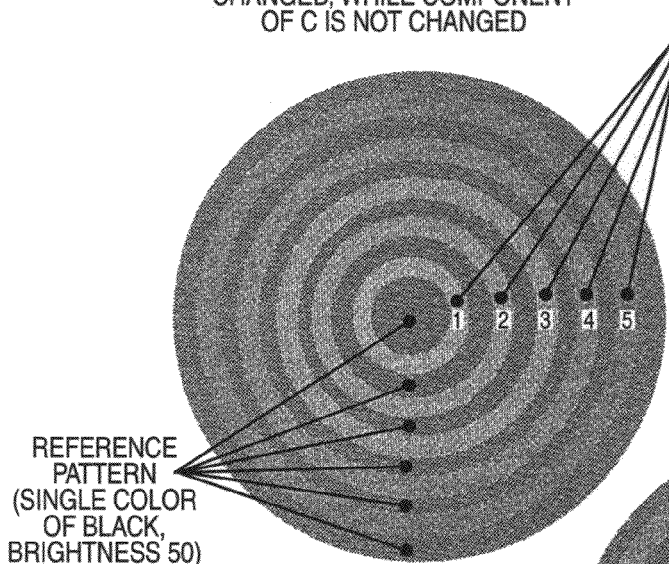
FIGS. 17A-17C are a correcting chart for adjusting gray balance which is outputted from the image forming apparatus 1.
Figure 17B:
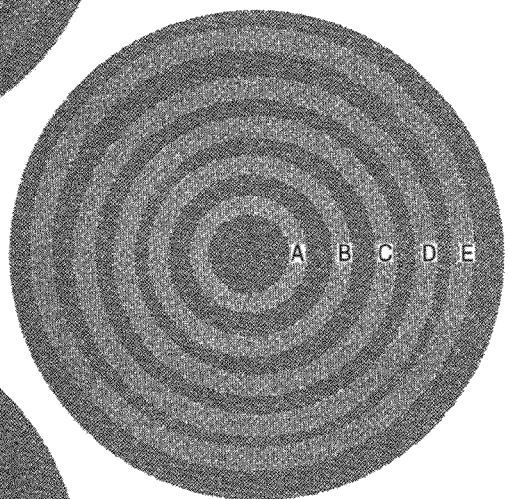
Figure 17C:
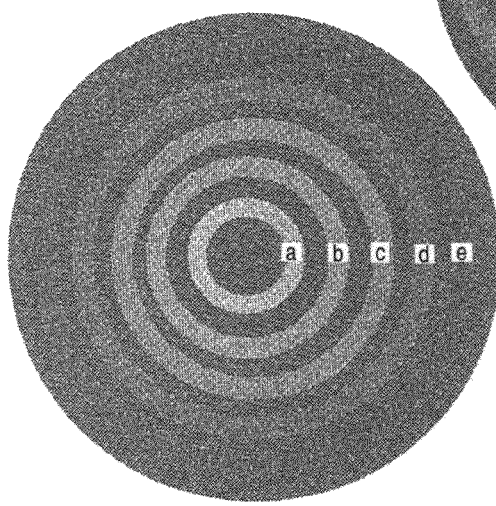
Figure 18:
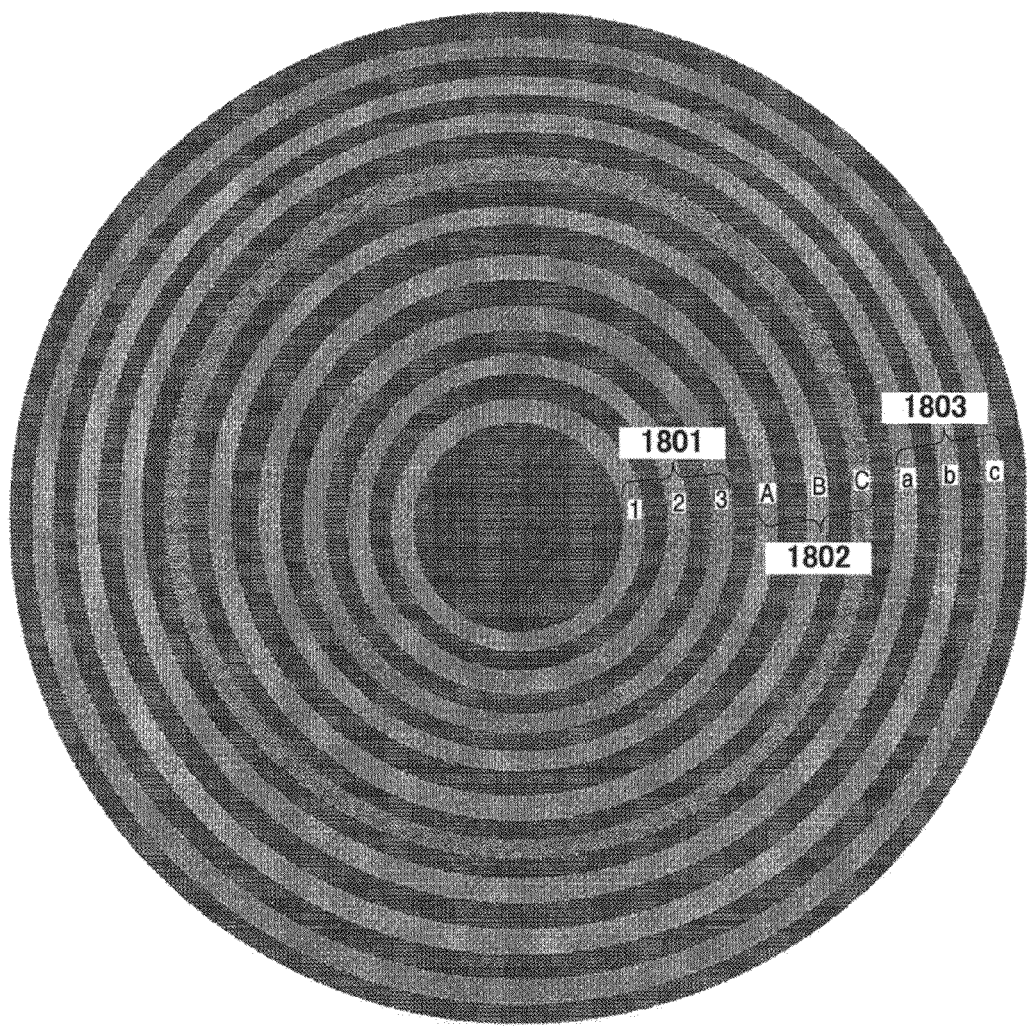
FIG. 18 is a correcting chart in which three concentric circles as shown in FIG. 17 are concentrated into one concentric circle.
Figure 19A:
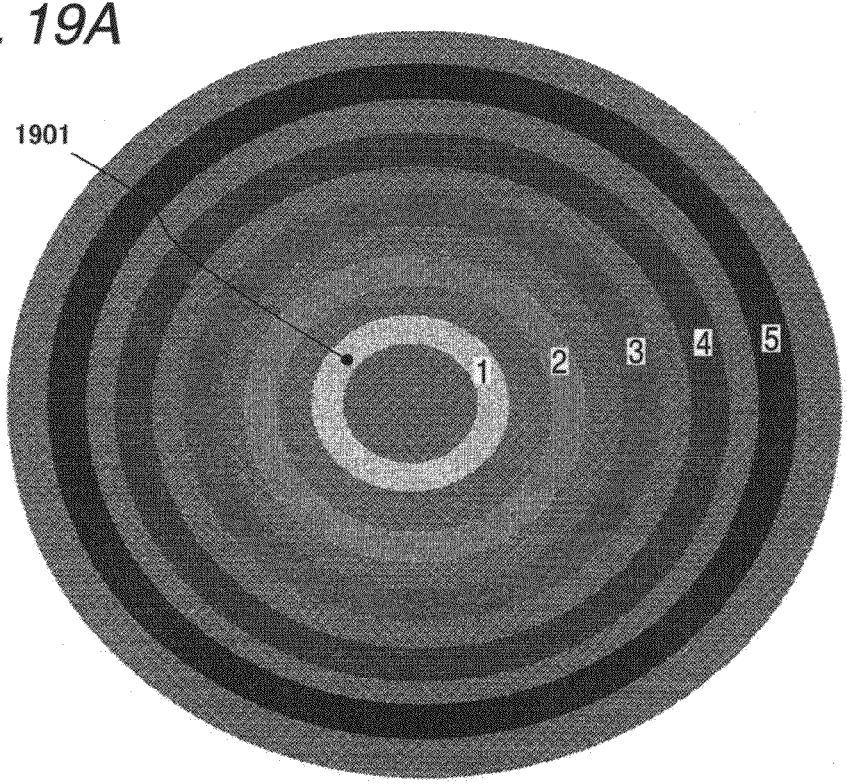
FIGS. 19A-19B are a correcting chart showing two concentric circles in which density is increased in opposite arrangement to each other.
Figure 19B:
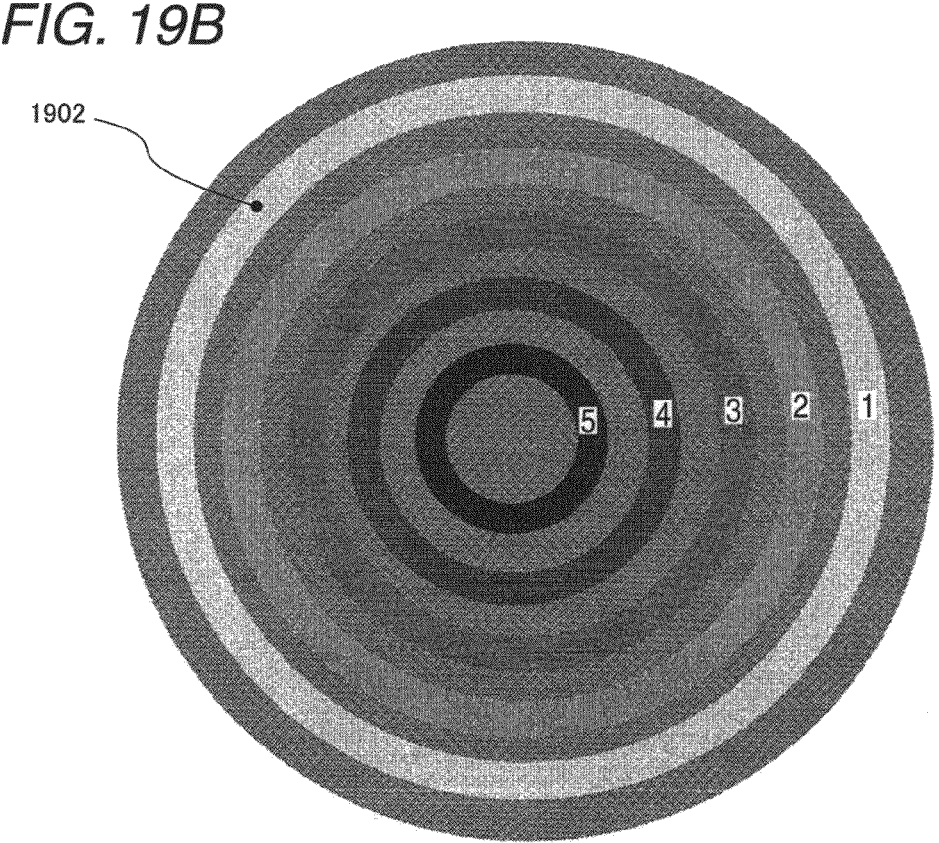

On the basis of the image data which are stored in the ROM 5 of the image forming apparatus 1, the correcting charts as shown in FIGS. 17, 18, and 19 are printed out.

FIG. 17 is a schematic view showing the correcting chart which is printed out from the image forming apparatus 1.

Referring to FIG. 17, the correcting chart will be described.

As shown in FIG. 17, in the correcting chart which is printed out for adjusting the gray balance, the reference patterns to be the references for comparison are printed in an ink of a single color K (black), and the adjusting patterns to be selected and printed in different colors are printed in an ink of process black which has been formed at different mixing ratio of C (cyan), M (magenta) and Y (yellow).

The single color K (black) of the reference patterns is printed at a determined brightness, while the process black of the adjusting patterns is printed by adjusting component amounts of C (cyan), M (magenta) and Y (yellow) so as to have substantially the same brightness as the single color K (black) of the reference patterns.

The user selects the adjusting pattern which appears to have the same color as the reference pattern, from this correcting chart, and inputs it to the display/operation part 3.

As shown in FIG. 17, the correcting chart has an arrangement of concentric circle in which the reference patterns and the adjusting patterns are arranged adjacent to each other at every angle, and the reference patterns and the adjusting patterns are alternately arranged.

The correcting chart is formed in three cases, namely, a case where the process black of different colors is formed, by varying the mixing ratio of the colors in the adjusting pattern in such a manner that the component amount of C (cyan) is not changed but the component amounts of M (magenta) and Y (yellow) are changed, as shown in FIG. 17(a), a case where the process black having different colors is formed, by varying the mixing ratio of the colors in the adjusting pattern in such a manner that the component amount of Y (yellow) is not changed, but the component amounts of C (cyan) and M (magenta) are changed, as shown in FIG. 17(b), and a case where the process black having different colors is formed, by varying the mixing ratio of the colors in the adjusting pattern in such a manner that the component amount of M (magenta) is not changed but the component amounts of C (cyan) and Y (yellow) are changed, as shown in FIG. 17(c).

All the concentric circles in which the adjusting patterns and the reference patterns are arranged as have been described referring to FIGS. 17(a), (b) and (c) may be printed on a single sheet of paper, or each of them may be printed on a single sheet of paper.

Alternatively, the three concentric circles which have been described referring to FIGS. 17(a), (b), (c) may be concentrated into one concentric circle, as shown in FIG. 18.

In the correcting chart as shown in FIG. 18, the one concentric circle is formed.

In the correcting chart as shown in FIG. 18, the reference patterns used as the references are printed at the determined brightness in the single color K (black).

In the correcting chart as shown in FIG. 18, the adjusting patterns to be selected by the user are composed of an area where the process black having different colors is formed in such a manner that the component amount of C (cyan) is not changed but the component amounts of M (magenta) and Y (yellow) are changed (reference numeral 1801), an area where the process black having different colors is formed in such a manner that the component amount of Y (yellow) is not changed, but the component amounts of C (cyan) and M (magenta) are changed (reference numeral 1802), and an area where the process black having different colors is formed in such a manner that the component amount of M (magenta) is not changed but the component amounts of C (cyan) and Y (yellow) are changed (reference numeral 1803).

When the correcting chart which has been described referring to FIG. 18 is printed, the three concentric circles which have been described referring to FIGS. 17(a), (b), (c) are concentrated into the one concentric circle.

The user prints out the correcting chart which has been described referring to FIG. 17 or 18 from the image forming apparatus 1, selects the adjusting pattern which appears to have the same color as the reference pattern, from this correcting chart, and inputs a value of the selected adjusting pattern to the display/operation part 3.

When the value of the selected adjusting pattern is inputted to the display/operation part 3, the gray balance is adjusted on the basis of the inputted value of the adjusting pattern, in the correction part 8 of the image forming apparatus 1.

Then, a case where the gray balance is corrected in the correction part 8, on the basis of an average value of the values of the adjusting patterns which have been selected by the user, using two kinds of charts in which the adjusting patterns are respectively arranged in opposite order to each other will be described referring to FIG. 19.

FIG. 19(*a*) is a correcting chart in which the mixing ratio of C (cyan), M (magenta) and Y (yellow) of the adjusting pattern are changed from the inside to the outside, and FIG. 19(*b*) is a correcting chart in which the regions of the adjusting patterns arranged in FIG. 19(*a*) are arranged in a reverse order from the inside to the outside.

In the correcting charts as shown in FIG. 19(*a*) and FIG. 19(*b*), the reference patterns are printed in a single color K (black), while the adjusting patterns are printed in process black having different colors which has been formed by varying the mixing ratio of C (cyan), M (magenta) and Y (yellow), in the same manner as the concentric circle where the adjusting patterns and the reference patterns, which are constituent elements of the correcting chart, are arranged, as has been described referring to FIG. 17. Moreover, the reference patterns and the adjusting patterns are alternately arranged so that they are in contact with each other at every angle, and further, they are arranged in a shape of concentric circle.

Further, in FIGS. 19(*a*) and 19(*b*), the different colors of the adjusting patterns are arranged in opposite order to each other (Specifically, in FIG. 19(*b*), the regions of the adjusting patterns as shown in FIG. 19(*a*) are arranged in a reverse order from the inside to the outside).

For example, although a region No. 1 of the adjusting pattern (reference numeral 1901) in FIG. 19(*a*) is arranged at an innermost side among the adjusting patterns, the region No. 1 is arranged at an outermost side among the adjusting patterns in the correcting chart in FIG. 19(*b*) (reference numeral 1902).

For the purpose of adjusting the gray balance, the user prints out the correcting chart as shown in FIG. 19(*a*) and the correcting chart as shown in FIG. 19(*b*) from the image forming apparatus 1.

Then, the user selects the adjusting patterns which appear to have the same color as the reference patterns, from the respective correcting charts, and inputs values of the selected adjusting patterns to the display/operation part 3.

In the correction part 8 of the image forming apparatus 1, an average value between the value of the adjusting pattern selected from the correcting chart in FIG. 19(*a*) and the value of the adjusting pattern selected from the correcting chart in FIG. 19(*b*) is calculated, and the gray balance is corrected on the basis of the calculated value.

Such process that one more correcting chart in which the arrangement of the patterns having different colors is reversed in order from the inside to the outside is formed, and the correction is conducted on the basis of the average value of the results of selection from the two correcting charts can be applied not only to the gray balance correction but also to the tone correction in other exemplary embodiments. In case where this process is applied to the tone correction, one more correcting chart in which the arrangement of the tone patterns having different colors is reversed in order is formed and printed, and receiving the results of selection from the two correcting charts from the user, the tone correction is conducted on the basis of the average value between the two results of selection.

The image data of the correcting charts which have been heretofore described referring to FIGS. 17, 18, 19 are stored in the ROM 5.

Exemplary Embodiment 6

In the sixth exemplary embodiment, the correcting chart for the gray balance which is printed out from the image forming apparatus 1 will be described.

Figure 21:
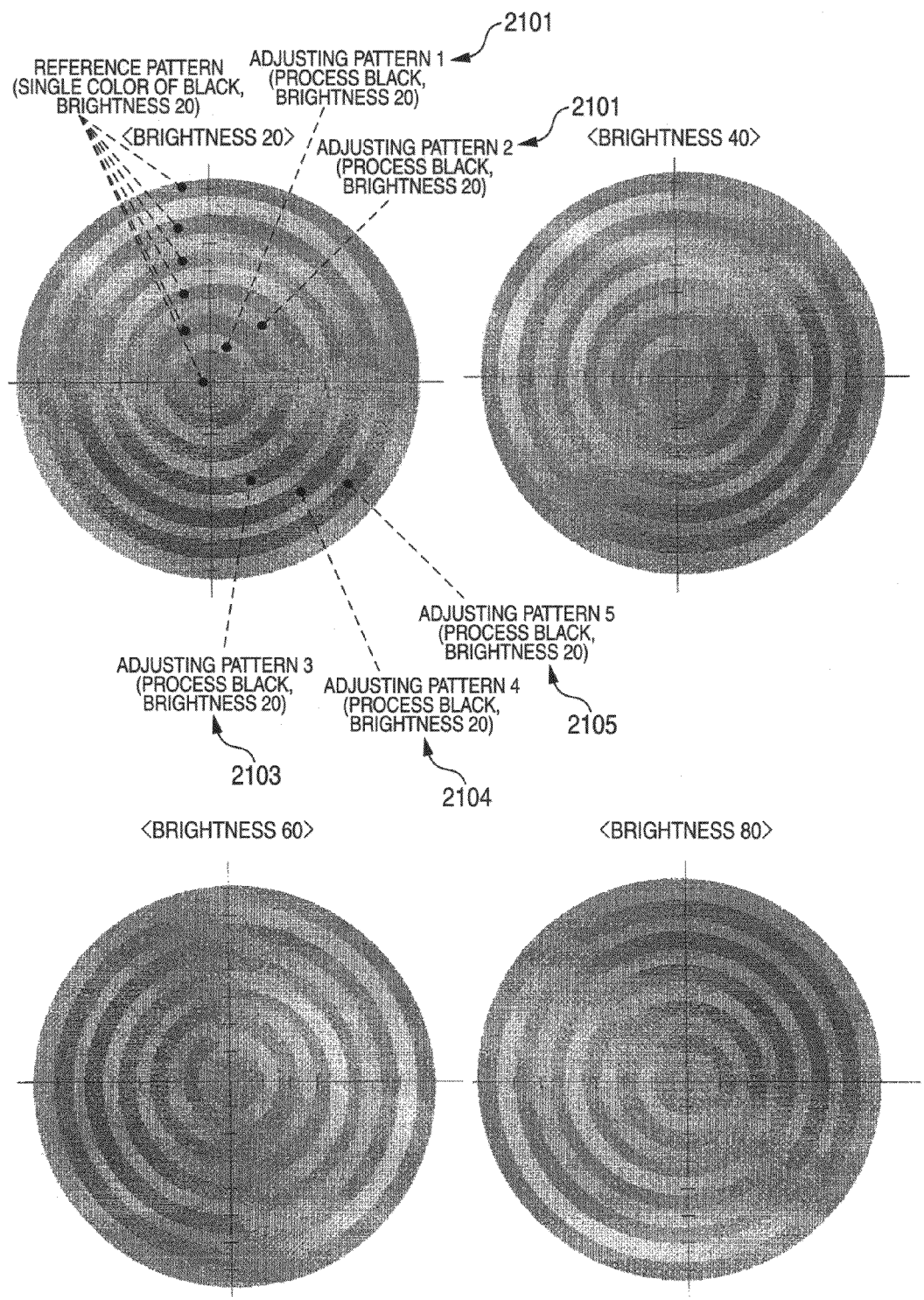
FIG. 21 is a schematic view showing a correcting chart in which colors are changed in a circumferential direction and radial direction of concentric circles.
Figure 22:
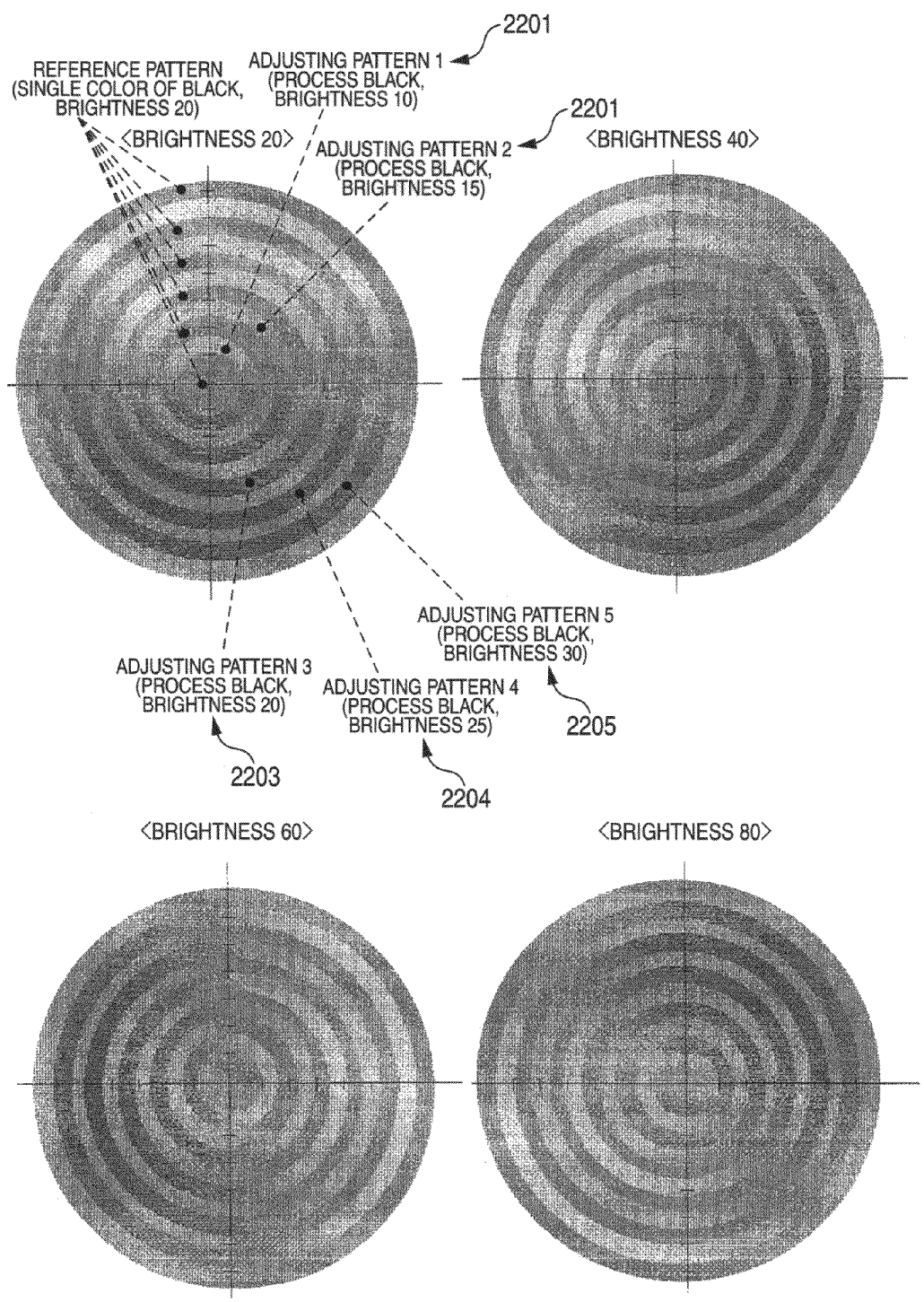
FIG. 22 is a schematic view showing correcting charts in which rings of concentric circles of adjusting charts have respectively different brightness.
Figure 23:
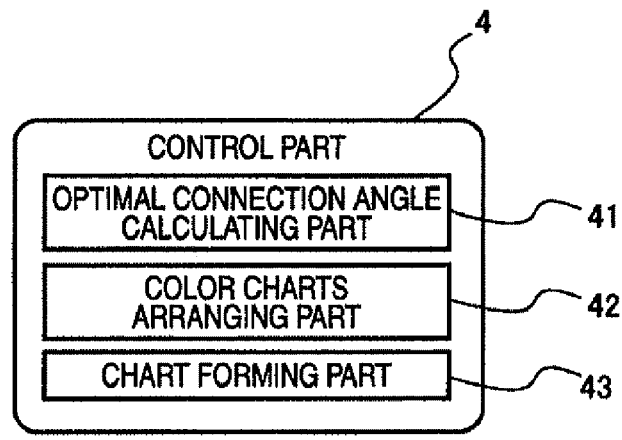
FIG. 23 is a block diagram showing a control part 4.
Figure 24:
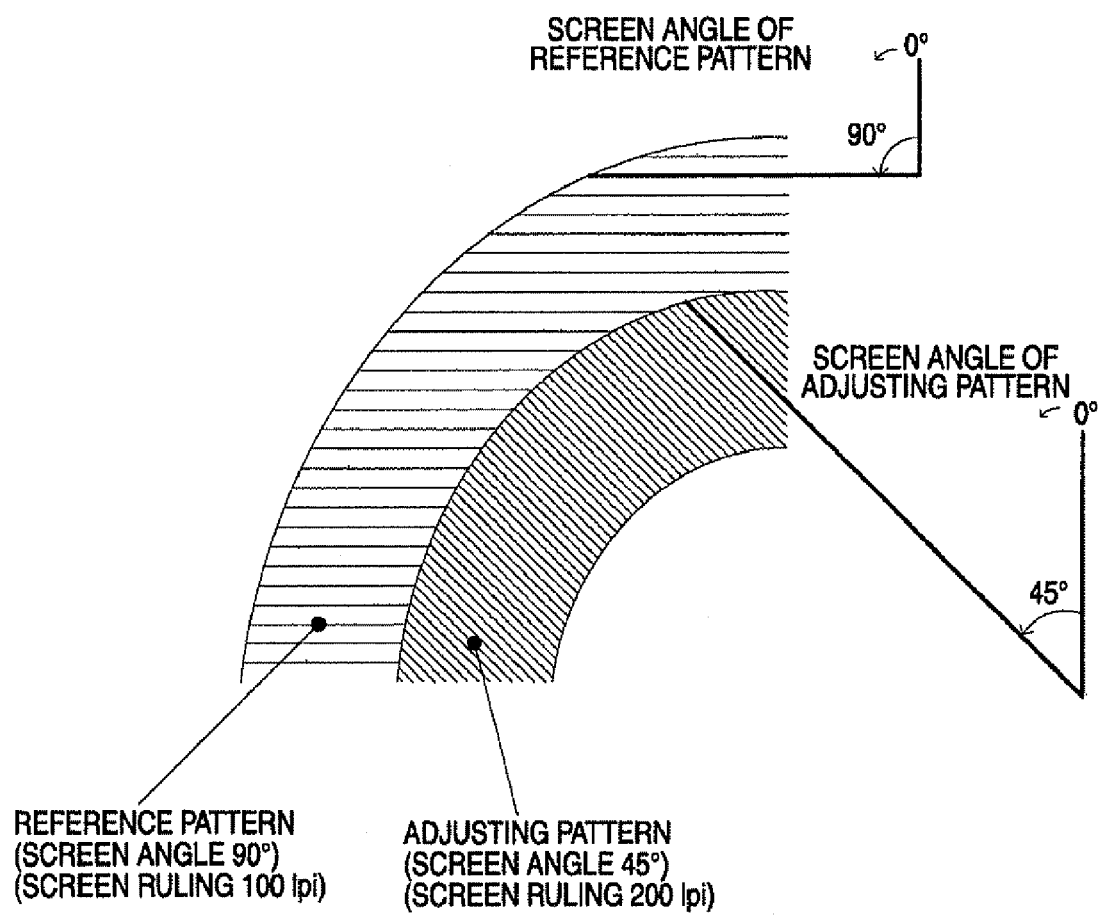
FIG. 24 is a schematic view showing screen angles of a reference pattern and an adjusting pattern.

On the basis of the image data which are stored in the ROM 5 of the image forming apparatus 1, correcting charts as shown in FIGS. 20, 21, and 22 are printed out.

FIG. 20 is a schematic view showing the correcting chart which is printed out from the image forming apparatus 1.

The correcting chart will be described referring to FIG. 20.

As shown in FIG. 20, in the correcting chart which is printed out for adjusting the gray balance, the reference patterns to be the references for comparison are printed in ink of a single color K (black), and the adjusting patterns to be selected are printed in an ink of process black which has been formed at different mixing ratio of C (cyan), M (magenta) and Y (yellow).

The single color K (black) of the reference patterns is printed at a determined brightness, while the process black of the adjusting patterns is printed by adjusting component amounts of C (cyan), M (magenta) and Y (yellow) so that the process black has substantially the same brightness as the single color K (black) of the reference patterns.

The regions of the adjusting patterns in the correcting chart as shown in FIG. 20 have gradations in such a manner that the colors are changed in a circumferential direction in respective annular regions.

In the correcting chart as shown in FIG. 20, the adjusting patterns, irrespective of inward adjusting patterns or outward adjusting patterns, are so formed that all the adjusting patterns have the same change of colors in the circumferential direction, and provided with indexes at equal intervals in the circumferential direction.

In case where the user selects the same color as the reference pattern from the adjusting patterns, the index provided in the circumferential direction of the adjusting patterns is selected (an index of reference numeral 2001 is selected in an example as shown in FIG. 20).

72 Indexes per one cycle are present in the circumferential direction of the adjusting patterns. Considering that the user can also select a position between the indexes, there are 144 selections among the adjusting patterns in the correcting chart as shown in FIG. 20.

It is also possible to make color of the indexes same as the color of the reference patterns so that the region of the adjusting patterns having the same color as the reference pattern can be easily selected.

The reference patterns and the adjusting patterns are adjacent to each other at every angle, and alternately arranged in a shape of concentric circle.

As shown in FIG. 20, a concentric circle composed of the reference patterns and the adjusting patterns having brightness of 20, a concentric circle composed of the reference patterns and the adjusting patterns having brightness of 40, a concentric circle composed of the reference patterns and the adjusting patterns having brightness of 60, and a concentric circle composed of the reference patterns and the adjusting patterns having brightness of 80 are printed on a single sheet of paper.

Then, the correcting chart will be described referring to FIG. 21.

FIG. 21 is a schematic view showing the correcting chart printed out from the image forming apparatus 1.

As shown in FIG. 21, in the correcting chart which is printed out for adjusting the gray balance, the reference patterns to be the references for comparison are printed in an ink of a single color K (black), and the adjusting patterns to be selected and printed in different colors are printed in an ink of process black which has been formed at different mixing ratio of C (cyan), M (magenta) and Y (yellow).

The single color K (black) of the reference patterns is printed at a determined brightness, while the process black of the adjusting patterns is printed by adjusting component amounts of C (cyan), M (magenta) and Y (yellow) so as to have substantially the same brightness as the single color K (black) of the reference patterns.

The reference patterns and the adjusting patterns are adjacent to each other at every angle, and alternately arranged in a shape of concentric circle.

The regions of the adjusting patterns in the correcting chart as shown in FIG. 21 have gradations in such a manner that the colors are changed in a circumferential direction in respective ring-like regions.

All the rings of the adjusting patterns existing in the concentric circle have gradations of different colors.

Specifically, in an example as shown in FIG. 21, a ring positioned at the innermost side of the concentric circle exists as the adjusting pattern 1 (reference numeral 2101), and a ring positioned next to it outwardly is printed as the adjusting pattern 2 (reference number 2102) with gradation in a different color from the adjusting pattern 1. Further, rings of the other adjusting patterns are formed as the adjusting pattern 3 (reference number 2103), the adjusting pattern 4 (reference number 2104), and the adjusting pattern 5 (reference number 2105), with gradation in respectively different colors from the rings of the other adjusting patterns.

Moreover, the concentric circle composed of the reference patterns and the adjusting patterns is provided with an axis of ordinate and an axis of abscissas.

As shown in FIG. 21, in the correcting chart which is printed out from the image forming apparatus 1, the concentric circle composed of the reference patterns and the adjusting patterns having brightness of 20, the concentric circle composed of the reference patterns and the adjusting patterns having brightness of 40, the concentric circle composed of the reference patterns and the adjusting patterns having brightness of 60, the concentric circle composed of the reference patterns and the adjusting patterns having brightness of 80 are printed.

According to the correcting chart as shown in FIG. 21, a large number of process blacks in which the mixing ratio of C (cyan), M (magenta) and Y (yellow) are varied are compared with the reference patterns.

Then, referring to FIG. 22, the correcting chart will be described.

FIG. 22 is a schematic view showing the correcting chart printed out from the image forming apparatus 1.

As shown in FIG. 22, in the correcting chart which is printed out for adjusting the gray balance, the reference patterns to be the references for comparison are printed in ink of a single color K (black), and the adjusting patterns having different colors to be selected are printed in an ink of process black which has been formed at different mixing ratio of C (cyan), M (magenta) and Y (yellow).

The reference patterns and the adjusting patterns are adjacent to each other at every angle, and alternately arranged in a shape of concentric circle.

In the correcting chart which is outputted from the image forming apparatus 1, four concentric circles composed of the reference patterns and the adjusting patterns are printed, as shown in FIG. 22.

In the four concentric circles, the reference patters have brightness of 20, 40, 60 and 80 respectively.

As shown in FIG. 22, brightness of the adjusting patterns which are constituent elements of the concentric circle including the reference patterns having the brightness of 20 is 10, 15, 20, 25 and 30.

The concentric circle which includes the reference patterns having the brightness of 20 is provided with five rings of the adjusting patterns, and there are an adjusting pattern 1 having the brightness of 10 (reference numeral 2201), an adjusting pattern 2 having the brightness of 15 (reference numeral 2202), an adjusting pattern 3 having the brightness of 20 (reference numeral 2203), an adjusting pattern 4 having the brightness of 25 (reference numeral 2204), and an adjusting pattern 5 having the brightness of 30 (reference numeral 2205).

Moreover, the concentric circle which includes the reference patterns having the brightness of 40 is provided with five rings of the adjusting patterns, and there are an adjusting pattern 6 having brightness of 30, an adjusting pattern 7 having brightness of 35, an adjusting pattern 8 having brightness of 40, an adjusting pattern 9 having brightness of 45, and an adjusting pattern 10 having brightness of 50.

Further, the concentric circle which includes the reference patterns having the brightness of 60 is provided with five rings of the adjusting patterns, and there are an adjusting pattern 11 having brightness of 50, an adjusting pattern 12 having brightness of 55, an adjusting pattern 13 having brightness of 60, an adjusting pattern 14 having brightness of 65, and an adjusting pattern 15 having brightness of 70.

Still further, the concentric circle which includes the reference patterns having the brightness of 80 is provided with five rings of the adjusting patterns, and there are an adjusting pattern 16 having brightness of 70, an adjusting pattern 17 having brightness of 75, an adjusting pattern 18 having brightness of 80, an adjusting pattern 19 having brightness of 85, and an adjusting pattern 20 having brightness of 90.

One of the rings of the adjusting patterns composing the concentric circle of the correcting chart as shown in FIG. 22 is formed with gradation in such a manner that the color is changed in a circumferential direction according to different mixing ratio of C (cyan), M (magenta) and Y (yellow).

Moreover, the concentric circle is provided with an axis of ordinate and an axis of abscissas. The user selects coordinate values representing a part of the adjusting pattern which has the same color as the color of the reference pattern on the coordinate axes, and inputs the coordinate values to the display/operation part 3. Then, according to the mixing ratio of C (cyan), M (magenta) and Y (yellow) in the adjusting pattern based on the inputted coordinate values, correction of the gray balance is carried out in the correction part 8.

The image data of the correcting charts which have been described referring to FIGS. 20, 21 and 22 are stored in the ROM 5. Therefore, provided that the index in FIG. 20 and the coordinate values in FIGS. 21, 22 are defined on the basis of the image data, the mixing ratio of C (cyan), M (magenta) and Y (yellow) in the process black in the adjusting chart which is shown by the indexes or the coordinate values will be known.

Exemplary Embodiment 7

In the seventh exemplary embodiment, a tone correcting chart which is printed out from the image forming apparatus 1 will be described.

In the tone correcting chart which is printed out from the image forming apparatus 1, the reference patterns and the tone patterns are respectively formed with respect to plural of colors such as C (cyan), M (magenta) and Y (yellow).

Although the reference patterns and the tone patterns are respectively formed on screens having determined screen rulings, the low screen ruling which is resistant against tone change is used as the screen ruling of the reference pattern.

The image forming apparatus 1 has the control part 4, and the control part 4 includes an optimal connection angle calculating part 41, color charts arranging part 42, and a chart forming part 43.

The optimal connection angle calculating part 41 calculates the optimal connection angle at which the screen of the reference pattern and the screen of the tone pattern are contacted with each other, on the basis of the screen ruling and screen angle of the reference pattern, and the screen ruling and screen angle of the tone pattern.

Provided that the screen ruling and the screen angle of the reference pattern are respectively m lpi (line per inch) and b degree, while the screen ruling and the screen angle of the adjusting pattern are respectively n lpi and a degree, the optimal connection angle Z is calculated as follows.

$$Z=a \tan [(1/\sin(b-a) \cdot (m/n + \cos(b-a))] \quad \text{(Formula 1)}$$

wherein Z=0, in case where b=a

The optimal connection angle Z is the angle at which the screen frequency number on a connection face between the reference pattern and the adjusting pattern is the highest.

For example, in case where the screen ruling and the screen angle of the reference pattern are respectively 100 lpi, 90 degree, and the screen ruling and the screen angle of the adjusting pattern are respectively 200 lpi, 45 degree, the optimal connection angle Z is calculated as follows.

$$Z=a \tan [1/\sin 45 \text{ degree} \times (100/200 + \cos 45 \text{ degree})]$$

□Z=59.6 degree

When the reference pattern and the tone pattern are arranged at this optimal angle which has been calculated by the optimal connection angle calculating part 41, a pattern of a connecting region between the reference pattern and the tone pattern becomes less distinguished, and comparison between the reference pattern and the tone pattern can be easily performed visually, even in a small printing area.

The color charts arranging part 42 arranges the charts having respective colors, on the basis of the optimal connection angles of the respective colors which have been calculated by the optimal connection angle calculating part 41.

Describing it referring to the above described example, because the optimal connection angle which has been calculated by the optimal connection angle calculating part 41 is 59.6 degree, the chart is arranged in such a manner that an area in the chart where the reference pattern is in contact with the adjusting pattern may be positioned at 59.6 degree from a determined position.

The chart forming part 43 forms image data of the correcting chart to be printed out, on the basis of the chart which has been arranged by the color charts arranging part 42.

Then, the tone correcting chart of which the image data are formed and printed by the control part 4 will be described referring to FIG. 25.

In this exemplary embodiment, the screen ruling and screen angle of the reference pattern and the screen ruling and screen angle of the adjusting pattern are set as follows, and the three colors of YMC are arranged on the same concentric circle.

The Screen of the Reference Pattern
  100 lpi, 90 degree (common to all the YMC)
The Screen of the Adjusting Pattern
  200 lpi, 90 degree (Y), 200 lpi, 45 degree (M)
  200 lpi, 135 degree (C)

The positions for arranging the respective colors are determined by the color charts arranging part 42, on the basis of the optimal connection angles which have been calculated by the optimal connection angle calculating part 41.

For example, the optimal connection angle of the chart of Magenta is calculated to be 59.6 degree using the formula 1, by the optimal connection angle calculating part 41. (Z=a tan [1/sin 45 degree×(100/200+cos 45 degree)] □Z=59.6 degree)

As the results, the color charts arranging part 42 positions the chart of magenta so that the chart of magenta may include a position at 59.6 degree from the determined position (reference numeral 2501).

In the same manner, the optimal connection angle of the chart of cyan is calculated to be 59.6 degree by the optimal connection angle calculating part 41. (Z=a tan [1/sin−45 degree×(100/200+cos−45 degree)] □Z=−59.6 degree)

As the results, the color charts arranging part 42 positions the chart of cyan so that the chart of cyan may includes a position at −59.6 degree from the determined position (reference numeral 2502).

In the same manner, the optimal connection angle of the chart of yellow is calculated to be 0 degree by the optimal connection angle calculating part 41. (Z=0 degree, because b=a)

As the results, the color charts arranging part 42 positions the chart of yellow so that the chart of yellow may include a position at 0 degree from the determined position (reference numeral 2503).

The color charts arranging part 42 performs arrangement, by adjusting the positions of the charts of the respective colors so as to contain the positions at the optimal connection angles of the respective colors (In this example, Y=0 degree, M=59.6 degree, C=−59.6 degree). Thereafter, the chart forming part 43 forms the image data of the correcting chart, on the basis of the arrangement by the color charts arranging part 42, and print outs the image data. As the results, the chart having the three colors Y, M, C arranged on the same concentric circle as shown in FIG. 25 will be printed.

Figure 25:
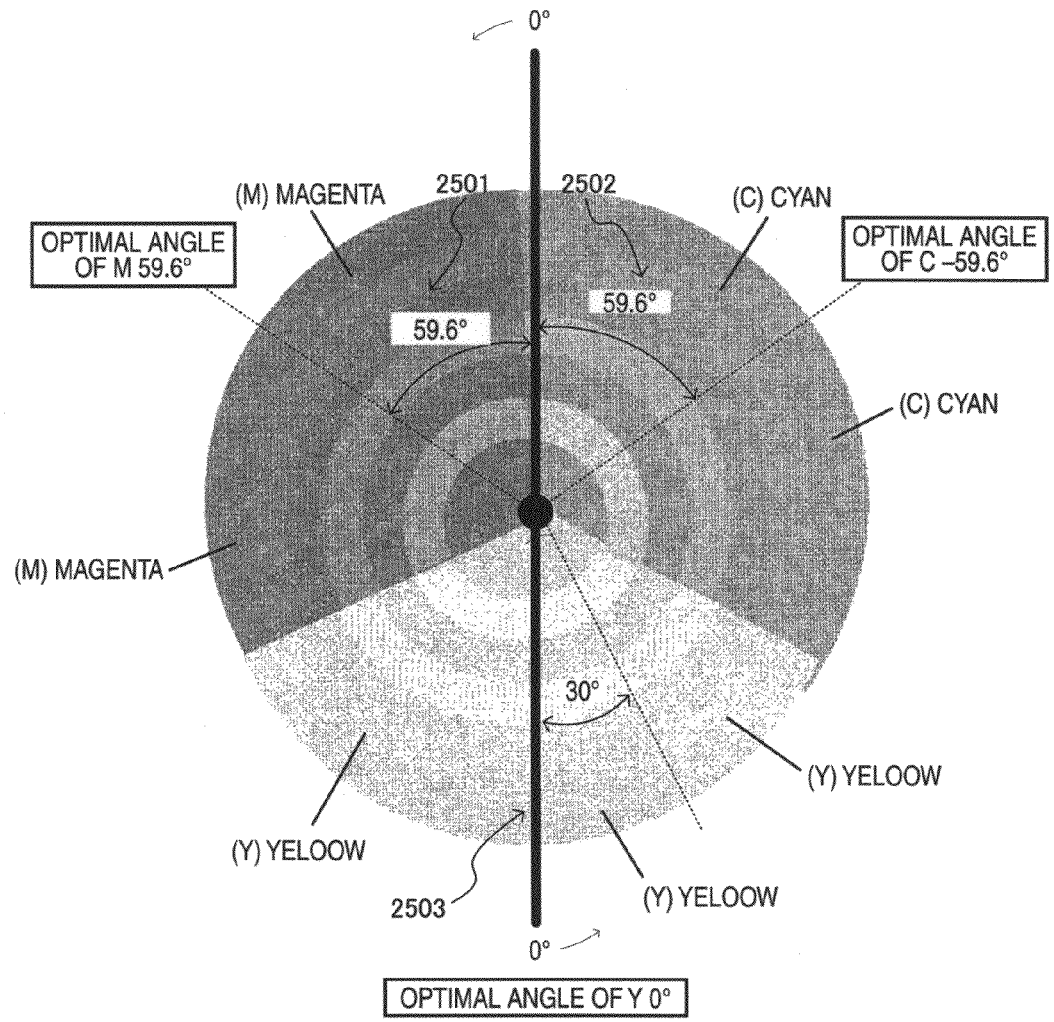
FIG. 25 is a schematic view showing a correcting chart in which reference patterns and tone patterns are contained in a concentric circle with respect to plural of colors.

In case where the optimal connection angle of the chart of yellow is calculated to be 30 degree, for example, when a chart in a sector shape covering 120 degree at both sides of a position at 30 degree is arranged as shown in FIG. 25, the chart is overlapped with the other color (in this case, cyan). Therefore, the chart of yellow is arranged in such a shape that it contains 30 degree which is the optimal connection angle (at both sides of 0 degree, for example, as shown in FIG. 25).

Provided that the number of colors to be printed on the same concentric circle is t, the respective colors may be allocated in a sector shape having an interior angle of 360/t degree, and the angle may be adjusted by the color charts arranging part 42.

Then, a tone correcting chart which is printed out in case where the control part 4 of the image forming apparatus 1 has a reference screen changing part 44 will be described, referring to FIGS. 26, 27 and 28.

Figure 26:
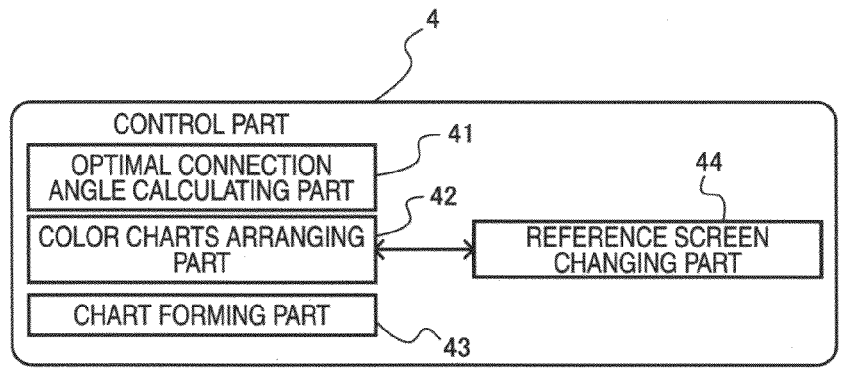
FIG. 26 is a block diagram of the control part 4 provided with a reference screen changing part 44.

As shown in FIG. 26, the control part 4 of the image forming apparatus 1 has the reference screen changing part 44.

The reference screen changing part 44 changes the screen ruling and the screen angle of the reference pattern which is arranged on the correcting chart, according to necessity.

In case where all the connection angles which have been calculated by the optimal connection angle calculating part 41 have become the same, for example, it is impossible for the color charts arranging part 42 to arrange the charts of the respective colors, under the same condition. In such case, the reference screen changing part 44 functions.

Figure 27:
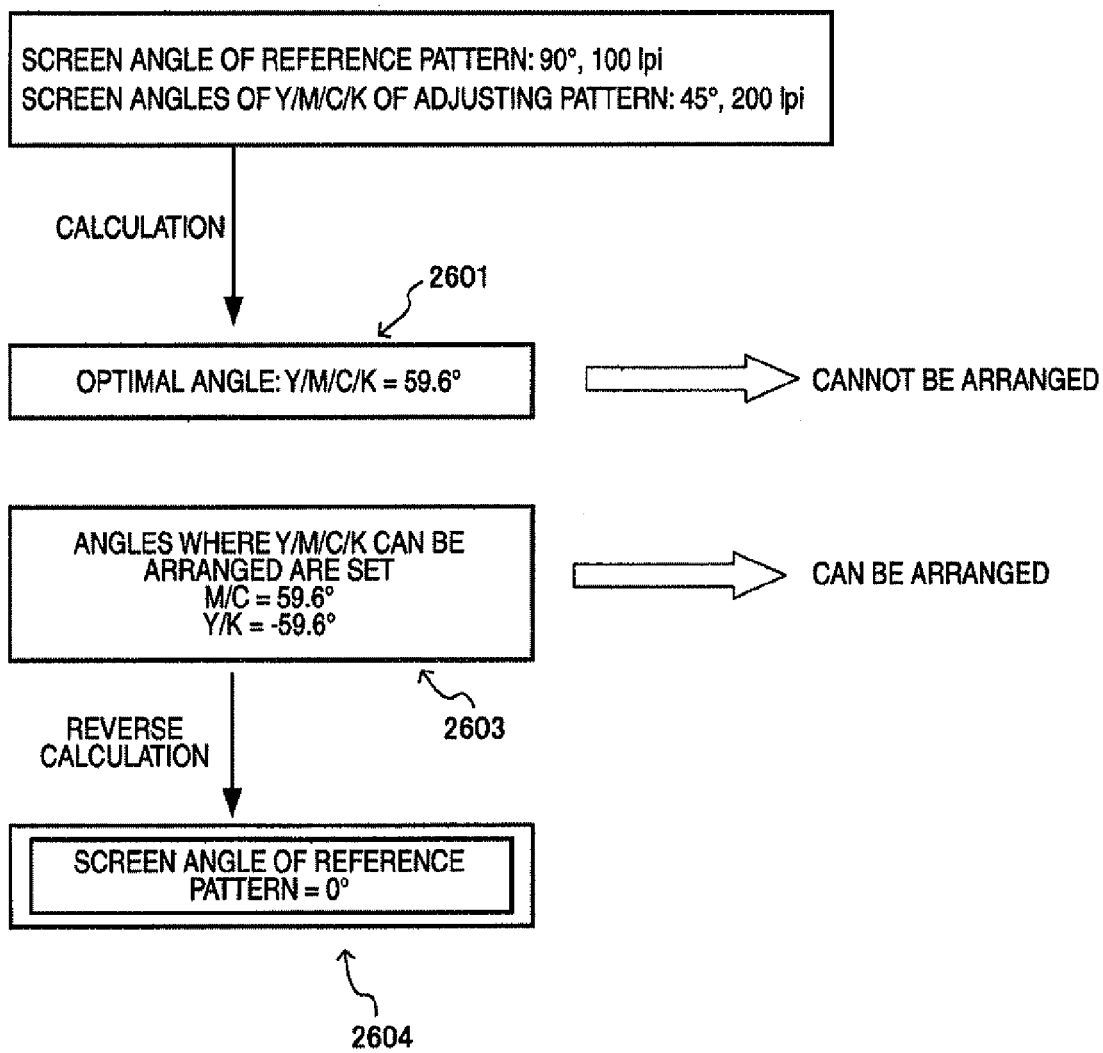
FIG. 27 is a view showing process performed in the reference screen changing part 44.

Specifically describing, as shown in FIG. 27, the four colors C (cyan), M (magenta), Y (yellow) and K (black) are arranged on the correcting chart. In case where the screen angle of the reference pattern is 90 degree, and the screen ruling is 100 lpi with respect to all the four colors Y, M, C, K, while the screen angle of the adjusting pattern is 45 degree and the screen ruling is 200 lpi with respect to all the four colors Y, M, C, K, the connection angle calculated by the optimal connection angle calculating part 41 is 59.6 degree with respect to all the four colors Y, M, C, K (reference numeral 2601).

In this case, all the optimal connection angles of the charts of the four colors are the same, and so, it is impossible to arrange the charts of the four colors in the one concentric circle (reference numeral 2602).

Therefore, the reference screen changing part 44 changes the connection angles of the respective colors to such values that the charts of the respective colors can be arranged.

For example, in case where the respective connection angles of Y, M, C, K are 59.6 degree, the connection angles of Y, K are changed to −59.6 degree, while the connection angles of M, C are maintained at 59.6 degree (reference numeral 2603).

Then, after the connection angles of Y, K have been changed to −59.6 degree, the reference screen changing part 44 obtains the screen angle b of the reference patterns of Y, K from the formula 1. As the results, b=0 degree is obtained from the following formula (reference numeral 2604).

$$-59.6 = a\tan[1/\sin-45\ degree \times (100/200 + \cos-45\ degree)]$$

After the screen angle (or the screen ruling) has been obtained from the reference screen changing part 44, the color charts arranging part 42 arranges the charts of Y, M, C, K, on the bases of the values which have been changed by the reference screen changing part 44.

Then, the chart forming part 43 forms and prints the image data of the correcting chart, on the basis of the arrangement by the color charts arranging part 42.

Figure 28:
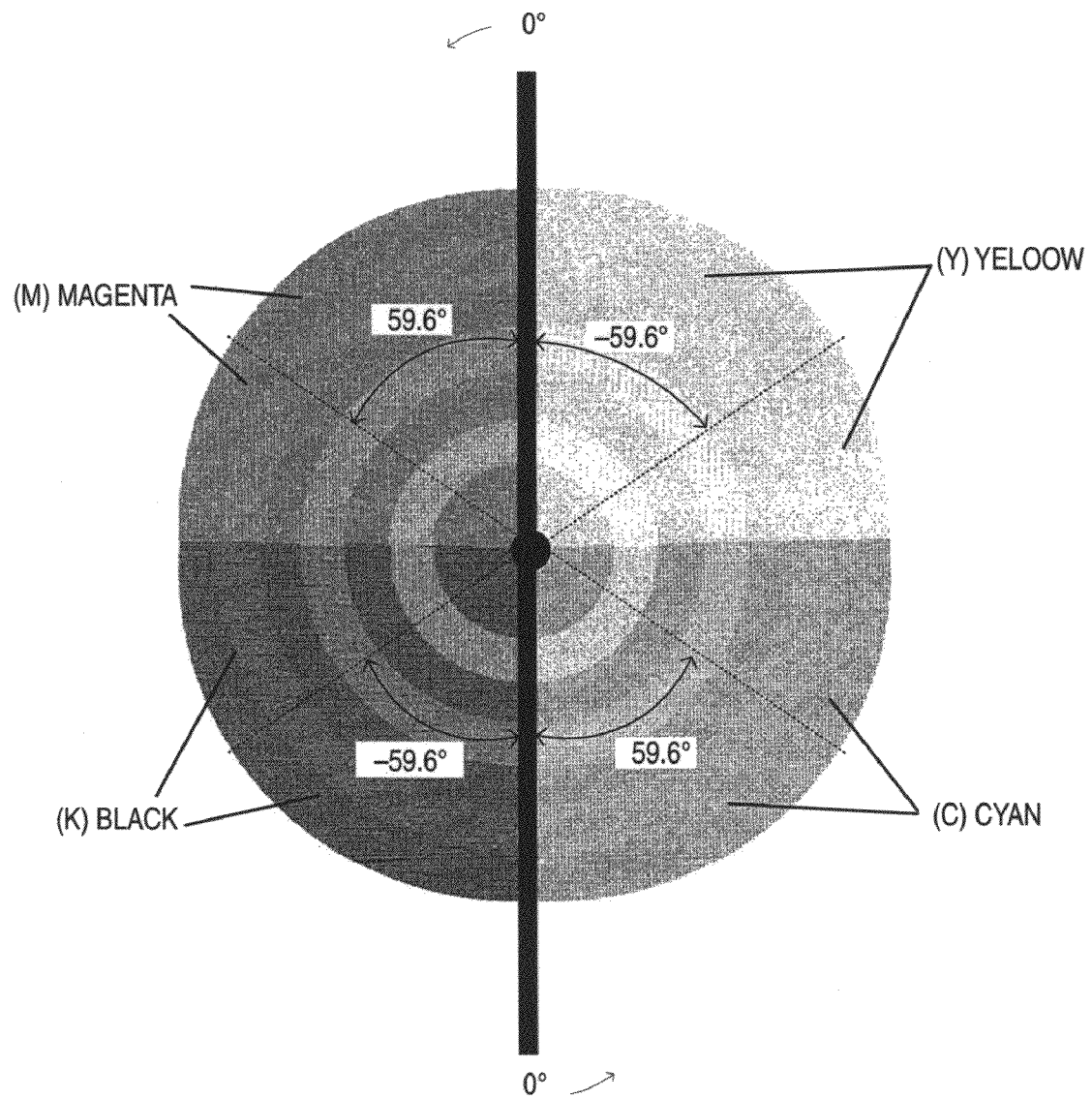
FIG. 28 is a schematic view of a correcting chart in which screen angles of the reference patterns have been changed by the reference pattern changing part 44.

In the correcting chart which has been printed out, M (magenta) and C (cyan) are arranged so as to contain the connection angle of 59.6 degree, and Y (yellow) and K (black) are arranged so as to contain the connection angle of −59.6 degree, as shown in FIG. 28.

Moreover, the screen angle of the reference pattern is maintained at 90 degree with respect to M, C, while the screen angle is changed to 0 degree with respect to Y, K.

In this manner, in case where the color charts arranging part 42 cannot arrange the charts of the respective colors, it is possible to arrange the charts of the respective colors, by changing the screen angle or the screen ruling of the reference pattern by the function of the reference screen changing part 44.

This invention can be utilized in the image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus including a processor, the apparatus comprising:
    a chart data forming unit that forms density correcting chart data to be printed, in which reference density patterns and adjusting density patterns are arranged so that a connection angle at which the reference density patters and the adjusting density patterns are contacted with each other contains all angles, and the adjusting density patterns have different densities in the respective adjusting density patterns;
    a printing unit that prints a density correcting chart in which the reference density patterns and the adjusting density patterns are arranged adjacent to each other in respective patterns, on the basis of the density correcting chart data;
    a receiving unit that receives an input of a density adjusting value of a desired pattern, on the basis of comparison of density between the reference density patterns and the adjusting density patterns which has been obtained from visual observation of a user on the printed density correcting chart; and
    a tone correcting unit that conducts tone correction of the desired pattern, on the basis of the density adjusting value of the desired pattern which has been received by the receiving unit.

2. The image forming apparatus according to claim 1, wherein the chart data forming unit forms the density correcting chart data in which the reference density patterns and the adjusting density patterns have a ring-like shape, and alternately arranged in a shape of concentric circle.

3. The image forming apparatus according to claim 2, wherein an innermost region and an outermost region of the concentric circle on the density correcting chart data which are formed by the chart data forming unit include the reference density patterns.

4. The image forming apparatus according to claim 1, wherein the innermost region of the concentric circle on the density correcting chart data which are formed by the chart data forming unit includes the reference density pattern having a round shape.

5. The image forming apparatus according to claim 1, wherein
    the chart data forming unit forms the density correcting chart data in which density of the adjusting density patters in the concentric circle is gradually increased from the innermost region to the outermost region, and the density correcting chart data in which density of the adjusting density patters in the concentric circle is gradually reduced from the innermost region to the outermost region,
    the printing unit prints two types of the density correcting charts which have been formed by the chart data forming unit, the receiving unit receives the density adjusting values respectively from the two types of the density correcting charts which have been printed by the printing unit, and the tone correcting unit conducts tone correction, on the basis of an average value between the two density adjusting values which have been received by the receiving unit.

6. The image forming apparatus according to claim 1, wherein the chart data forming unit forms the density correcting chart data in which the reference density patterns and the adjusting density patterns have a ring-like shape, and rings of the reference density patterns and the adjusting density patterns are gradually varied in width.

7. The image forming apparatus according to claim 6, wherein the chart data forming unit forms the density correcting chart data in which centers of the rings of the reference density patterns and the adjusting density patterns are eccentrically arranged.

8. The image forming apparatus according to claim 6, wherein the chart data forming unit forms the density correcting chart data in which the rings of the reference density patterns and the adjusting density patterns have an elliptical shape, and centers of the rings are arranged at a same position.

9. The image forming apparatus according to claim 6, wherein the innermost region and the outermost region of the concentric circle on the density correcting chart data which are formed by the chart data forming unit include the reference density patterns.

10. The image forming apparatus according to claim 6, wherein the innermost region of the concentric circle on the density correcting chart data which are formed by the chart data forming unit includes the reference density pattern in a round shape.

11. The image forming apparatus according to claim 1, wherein the chart data forming unit forms the density correcting chart data in which double coils are formed of regions of the reference density patterns and regions of the adjusting density patterns.

12. The image forming apparatus according to claim 1, wherein the chart data forming unit forms the density correcting chart data in a shape of triple coils in which regions of the reference density patterns are interposed between two regions of the adjusting density patterns having different densities.

13. The image forming apparatus according to claim 11, wherein the chart data forming unit forms the density correcting chart data in which colors of the adjusting density patterns are continuously changed.

14. The image forming apparatus according to claim 11, wherein the chart data forming unit forms the density correcting chart data in which ranges where colors of the adjusting density patterns are continuously changed and ranges where the colors are not changed are alternately arranged.

15. An image forming apparatus including a processor, the apparatus comprising:
a first chart data forming unit that forms first density correcting chart data to be printed, which contains reference density patterns, and middle screen ruling adjusting density patterns composed of screens having higher screen ruling than screen ruling of the reference density patterns;
a first printing unit that prints a first density correcting chart in which the reference density patterns and the middle screen ruling adjusting density patterns are arranged adjacent to each other in the respective patterns, on the basis of the first density correcting chart data;
a first receiving unit that receives an input of a first density adjusting value of a desired pattern, on the basis of comparison of density between the reference density patterns and the middle screen ruling adjusting density patterns which has been obtained from visual observation of a user on the printed first density correcting chart;
a second chart data forming unit that forms second density correcting chart data to be printed, which contains the middle screen ruling adjusting density patterns having density based on the first density adjusting value of the desired pattern which has been received by the first receiving unit, and adjusting density patterns composed of screens having a higher screen ruling than a screen ruling of the middle screen ruling adjusting density patterns;
a second printing unit that prints a second density correcting chart in which the middle screen ruling adjusting density patterns and the adjusting density patterns are arranged adjacent to each other in the respective patterns, on the basis of the second density correcting chart data;
a second receiving unit that receives an input of the second density adjusting value of the desired pattern, on the basis of comparison of density between the middle screen ruling adjusting density patterns and the adjusting density patterns which has been obtained from visual observation of the user on the printed second density correcting chart; and
a tone correcting unit that conducts tone correction of the desired pattern, on the basis of the second density adjusting value of the desired pattern which has been received by the second receiving unit.

16. An image forming apparatus including a processor, the apparatus comprising:
an optimal angle calculating unit that calculates optimal connection angle at which a reference density pattern and an adjusting density pattern are contacted with each other;
a chart data forming unit that forms density correcting chart data to be printed, in which the reference density pattern and the adjusting density pattern are arranged so as to contain the connection angle which has been calculated by the optimal angle calculating unit;
a printing unit that prints a density correcting chart in which the reference density patterns and the adjusting density patterns are arranged adjacent to each other alternately in a shape of concentric circle in the respective patterns, on the basis of the density correcting chart data;
a receiving unit that receives an input of a density adjusting value of a desired pattern, on the basis of comparison of density between the reference density patterns and the adjusting density patterns which has been obtained from visual observation of a user on the printed density correcting chart; and
a tone correcting unit that conducts tone correction of the desired pattern, on the basis of the density adjusting value of the desired pattern which has been received by the receiving unit.

17. The image forming apparatus according to claim 16, wherein the chart data forming unit forms the density correcting chart data which contain the reference density patterns and the adjusting density patterns respectively having a plurality of colors, and
the reference density patterns and the adjusting density patterns are formed in a sector shape containing the connection angle which has been calculated by the optimal angle calculating unit.

18. The image forming apparatus according to claim 16, wherein the connection angle at which a sum of screen frequencies becomes the largest on a connection face between the reference density patterns and the adjusting density patterns is calculated as the optimal connection angle by the optimal angle calculating unit.

19. An image forming apparatus including a processor, the apparatus comprising:
- a chart data forming unit that forms gray balance correcting chart data to be printed, in which reference black patterns and adjusting black patterns are arranged in such a manner that a connection angle at which the reference density patterns and the adjusting density patterns are contacted with each other contains all angles;
- a printing unit that prints a gray balance correcting chart in which the reference black patterns and the adjusting black patterns are arranged adjacent to each other in the respective patterns, on the basis of the gray balance correcting chart data;
- a receiving unit that receives an input of an adjusting value of a desired pattern, on the basis of comparison of density between the reference black patterns and the adjusting black patterns which has been obtained from visual observation of a user on the printed gray balance correcting chart; and
- a gray balance correcting unit that conducts gray balance correction of the desired pattern, on the basis of the adjusting value of the desired patter which has been received by the receiving unit.

20. The image forming apparatus according to claim 19, wherein the chart data forming unit forms the gray balance correcting chart data in which the reference density patterns and the adjusting density patterns have a ring-like shape, and are alternately arranged in a shape of concentric circle.

21. The image forming apparatus according to claim 19, wherein the chart data forming unit forms the gray balance correcting chart data in such a manner that the reference black pattern has a single color of black, and the adjusting black pattern has process black of different colors in which component amounts of a plurality of colors for forming the process black are varied in a circumferential direction of the concentric circle.

22. The image forming apparatus according to claim 19, wherein the chart data forming unit forms the gray balance correcting chart data in such a manner that the reference black pattern has a single color of black, and in the adjusting black pattern, component amounts of a plurality of colors for forming the process black are constant in a radial direction of the concentric circle.

23. The image forming apparatus according to claim 19, wherein the chart data forming unit forms the gray balance correcting chart data in such a manner that the reference black pattern has a single color of black, and the adjusting black pattern has process black of different colors in which component amounts of a plurality of colors for forming the process black are varied in the respective patterns.

* * * * *